Jan. 24, 1939.　　B. GRANBERG ET AL　　2,144,735
MACHINE TOOL
Filed Feb. 29, 1936　　11 Sheets-Sheet 1
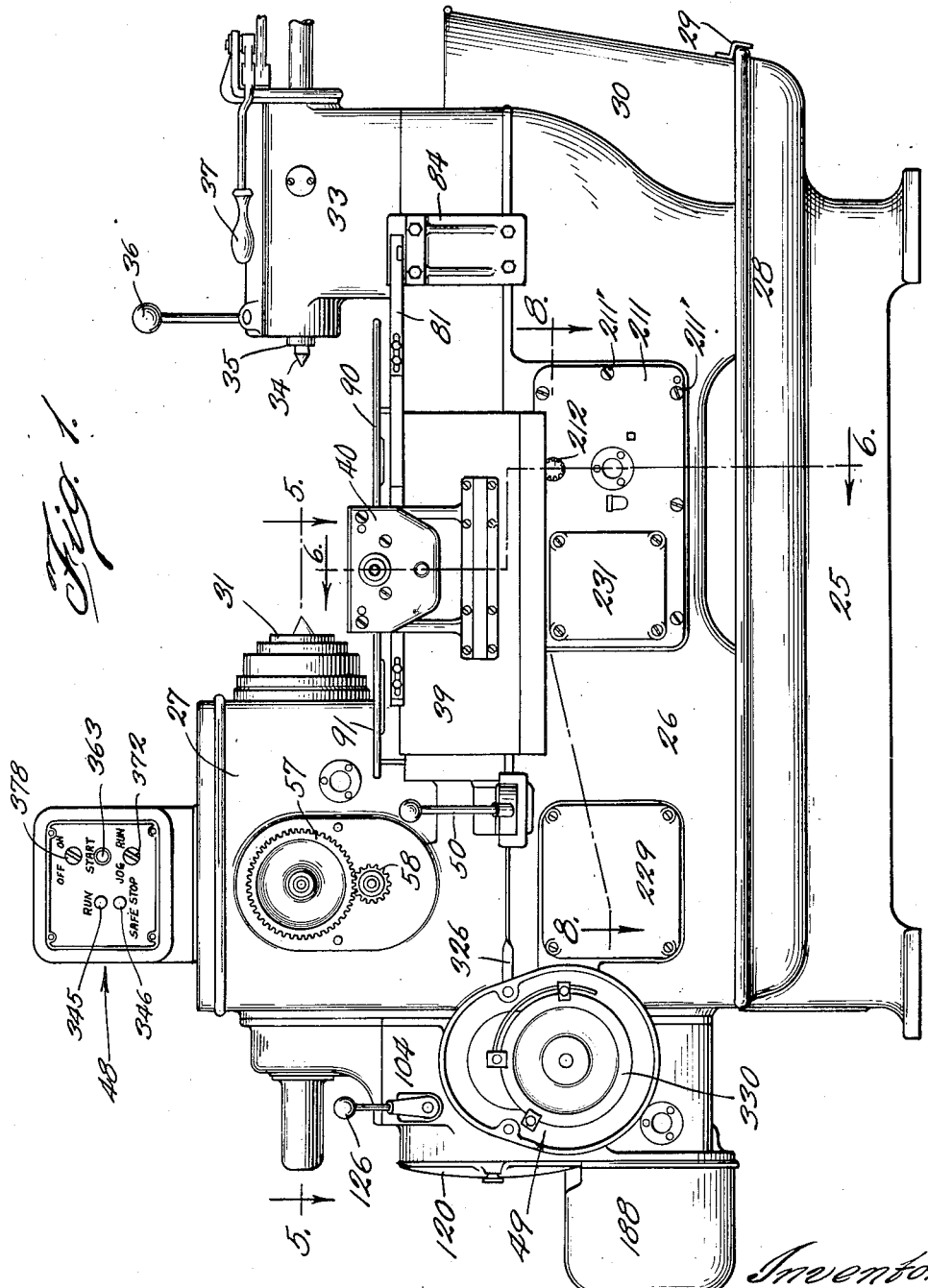
Inventors:
Bengt Granberg &
John B. Sinderson

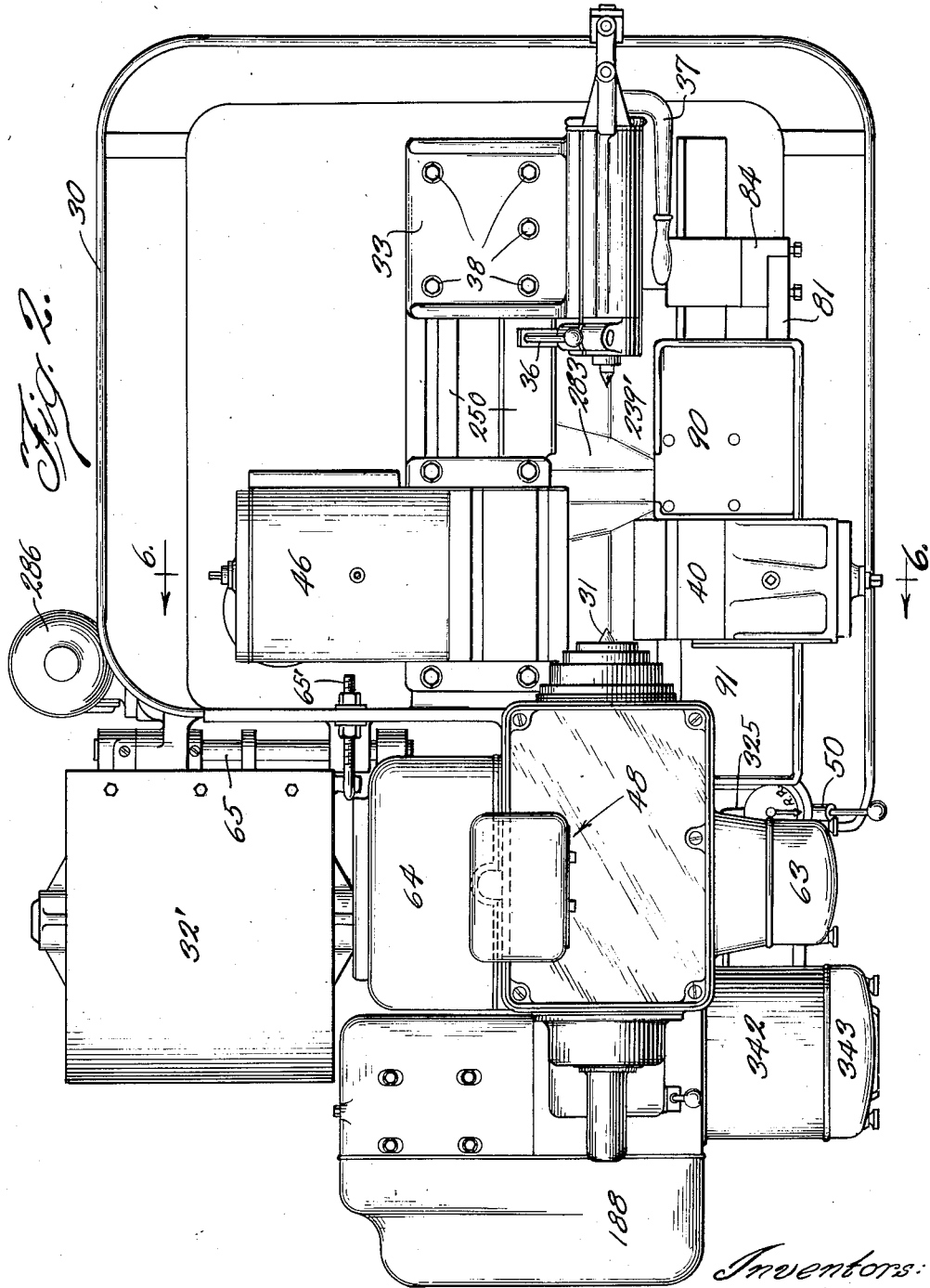

Jan. 24, 1939.  B. GRANBERG ET AL  2,144,735
MACHINE TOOL
Filed Feb. 29, 1936  11 Sheets-Sheet 3
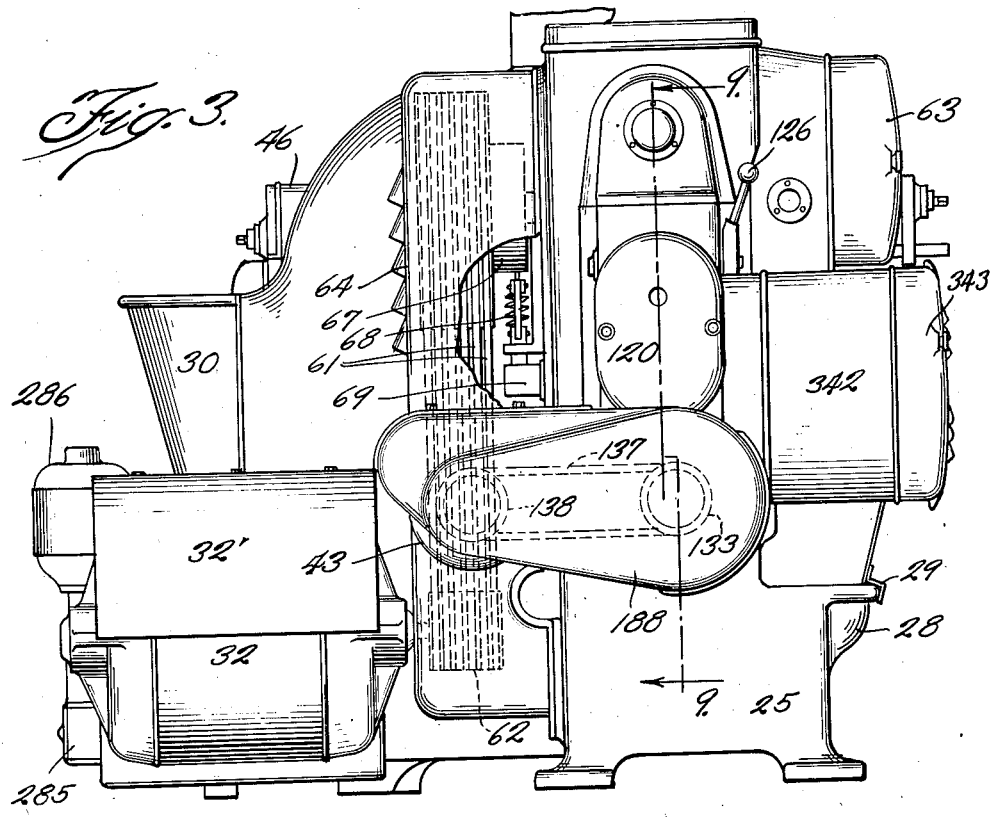
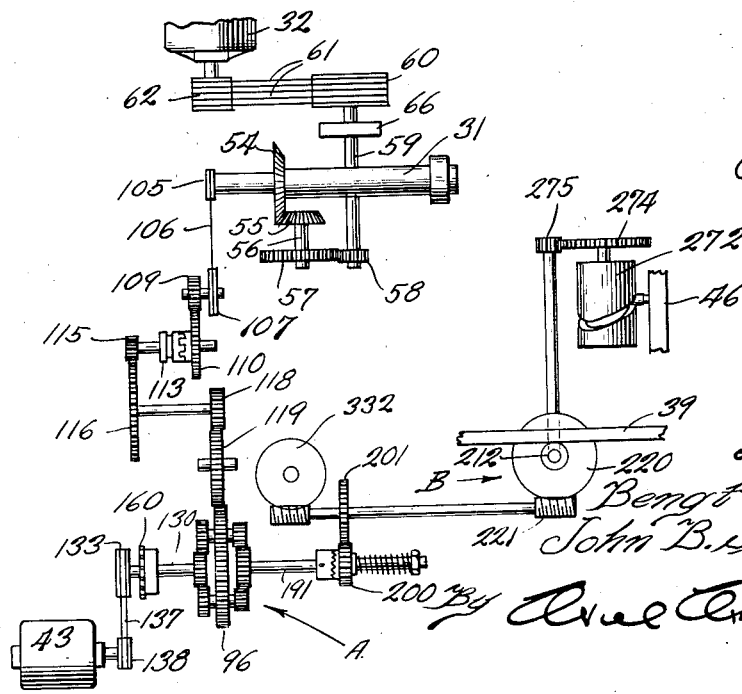
Inventors:
Bengt Granberg &
John B. Sinderson Jan. 24, 1939.  B. GRANBERG ET AL  2,144,735
MACHINE TOOL
Filed Feb. 29, 1936  11 Sheets-Sheet 5
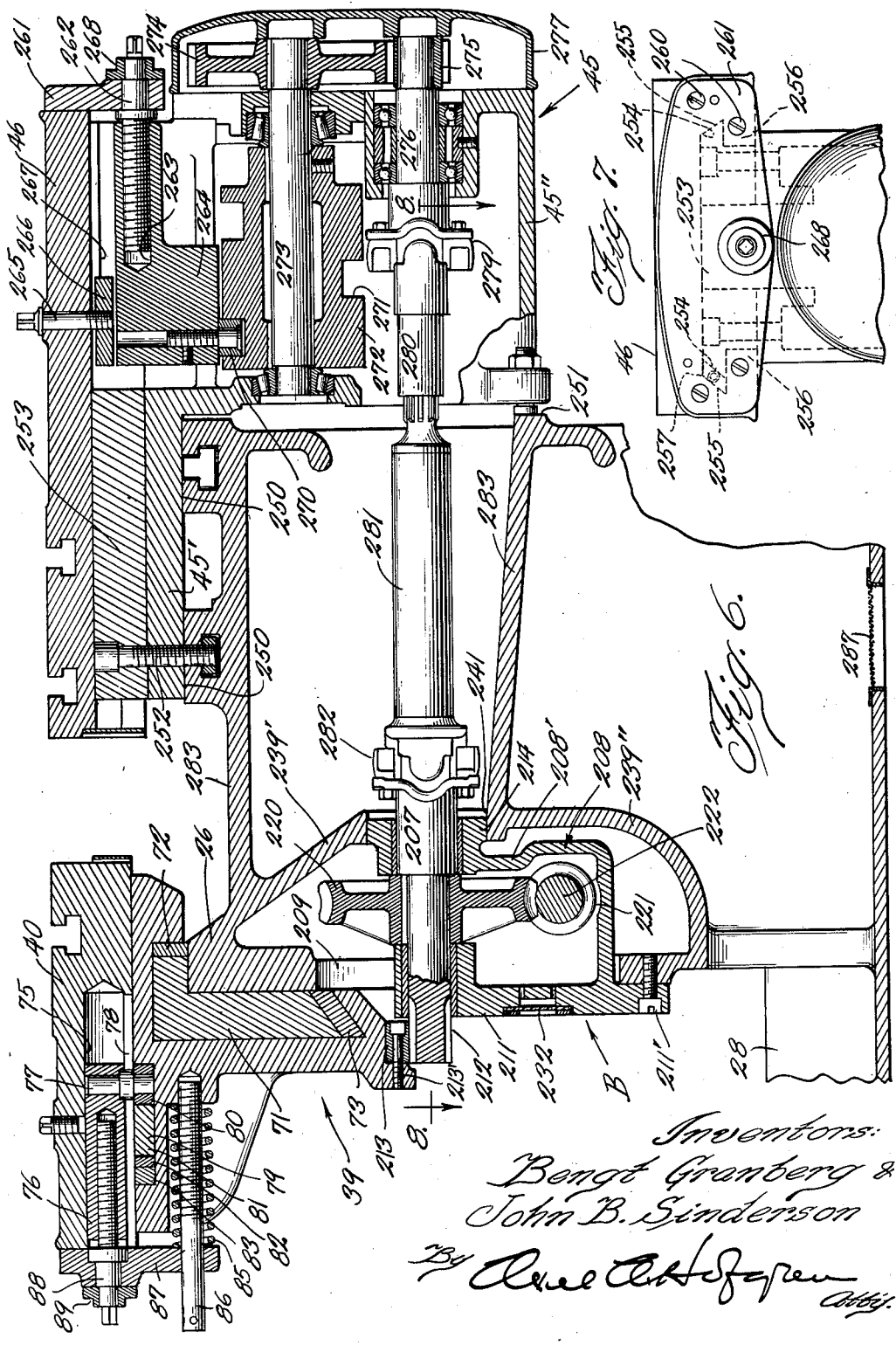
Inventors:
Bengt Granberg &
John B. Sinderson
By [signature]
Atty.

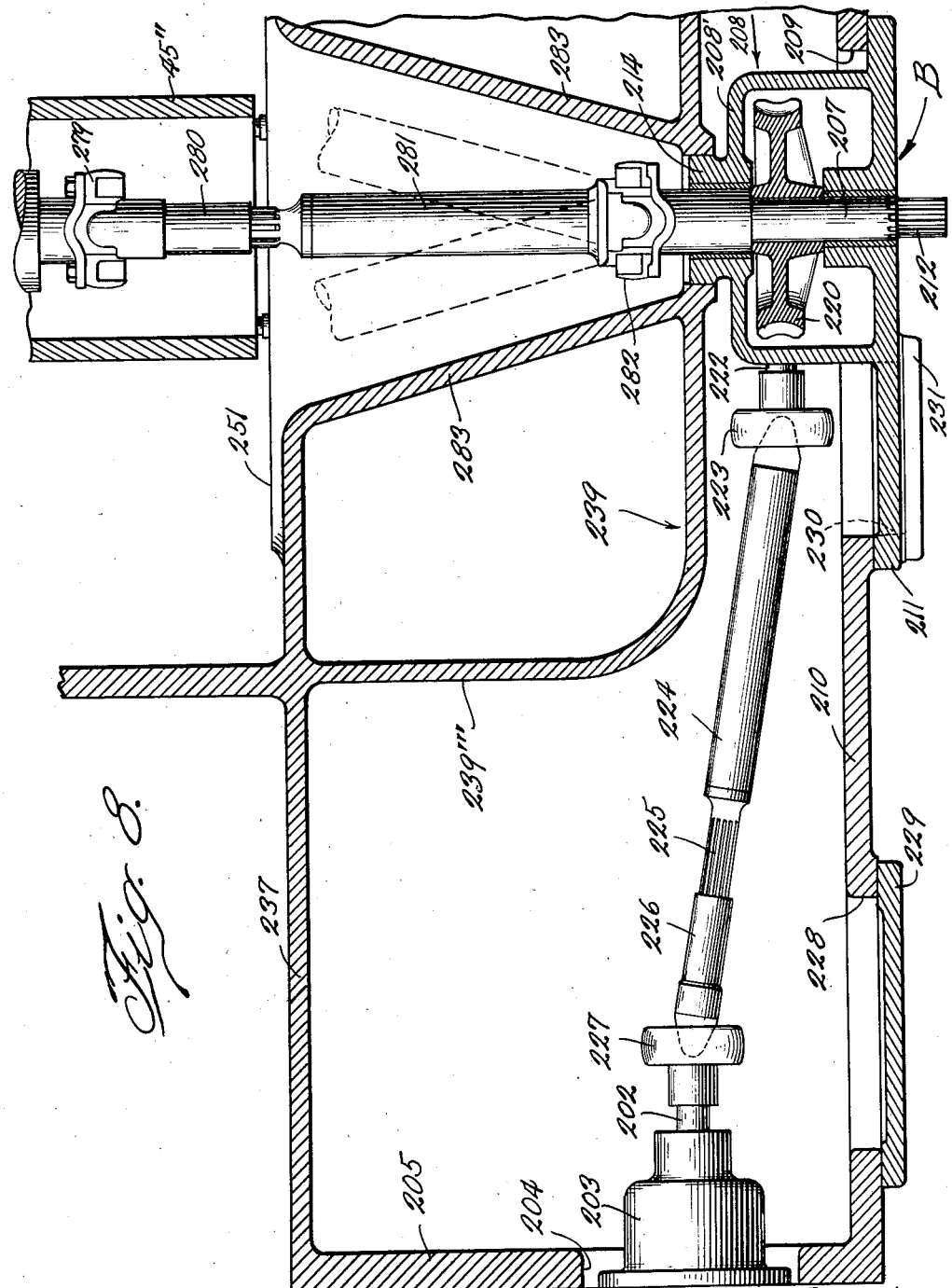

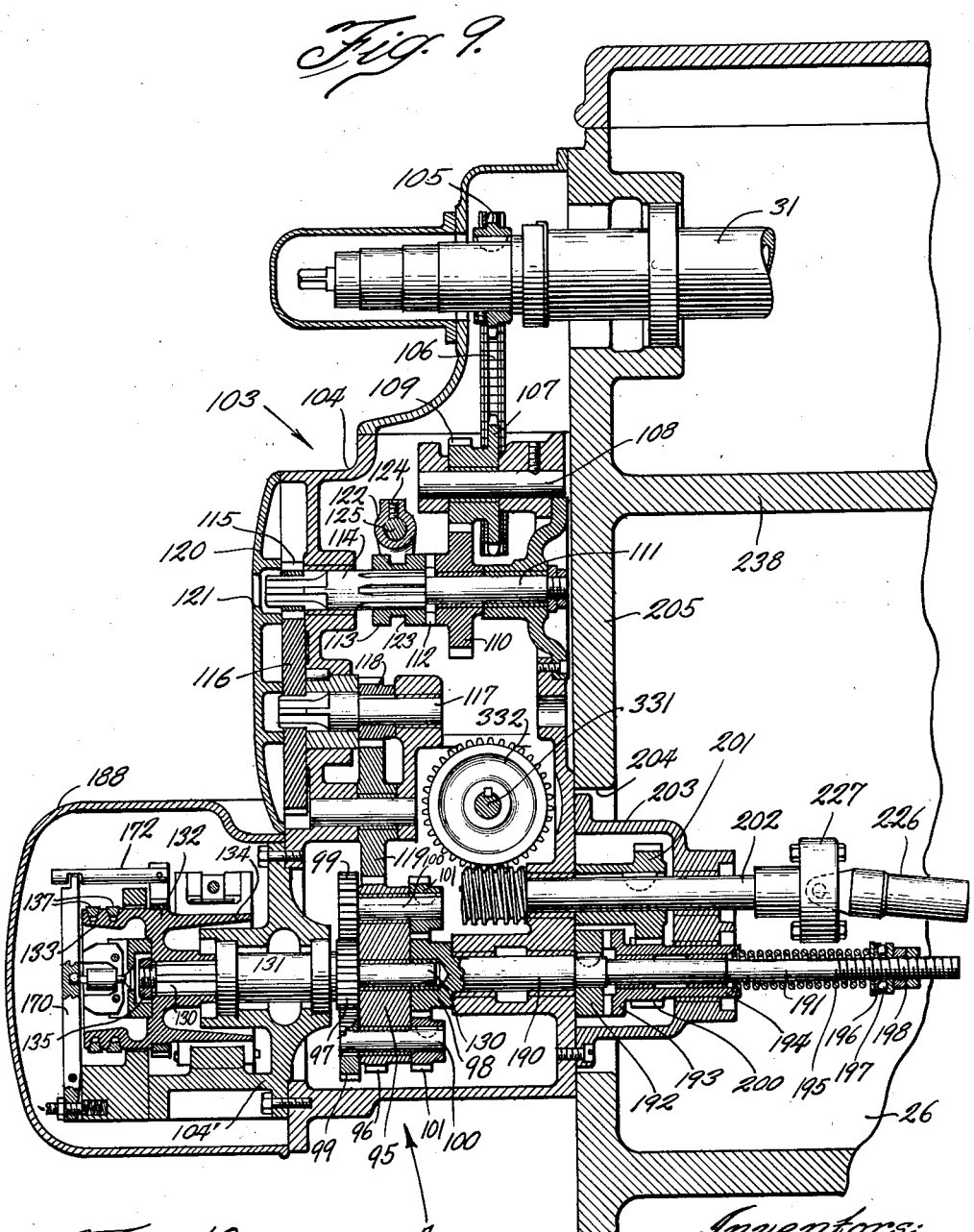

Jan. 24, 1939. B. GRANBERG ET AL 2,144,735
MACHINE TOOL
Filed Feb. 29, 1936 11 Sheets-Sheet 8

Inventors:
Bengt Granberg &
John B. Sinderson

Jan. 24, 1939.  B. GRANBERG ET AL  2,144,735
MACHINE TOOL
Filed Feb. 29, 1936    11 Sheets-Sheet 9
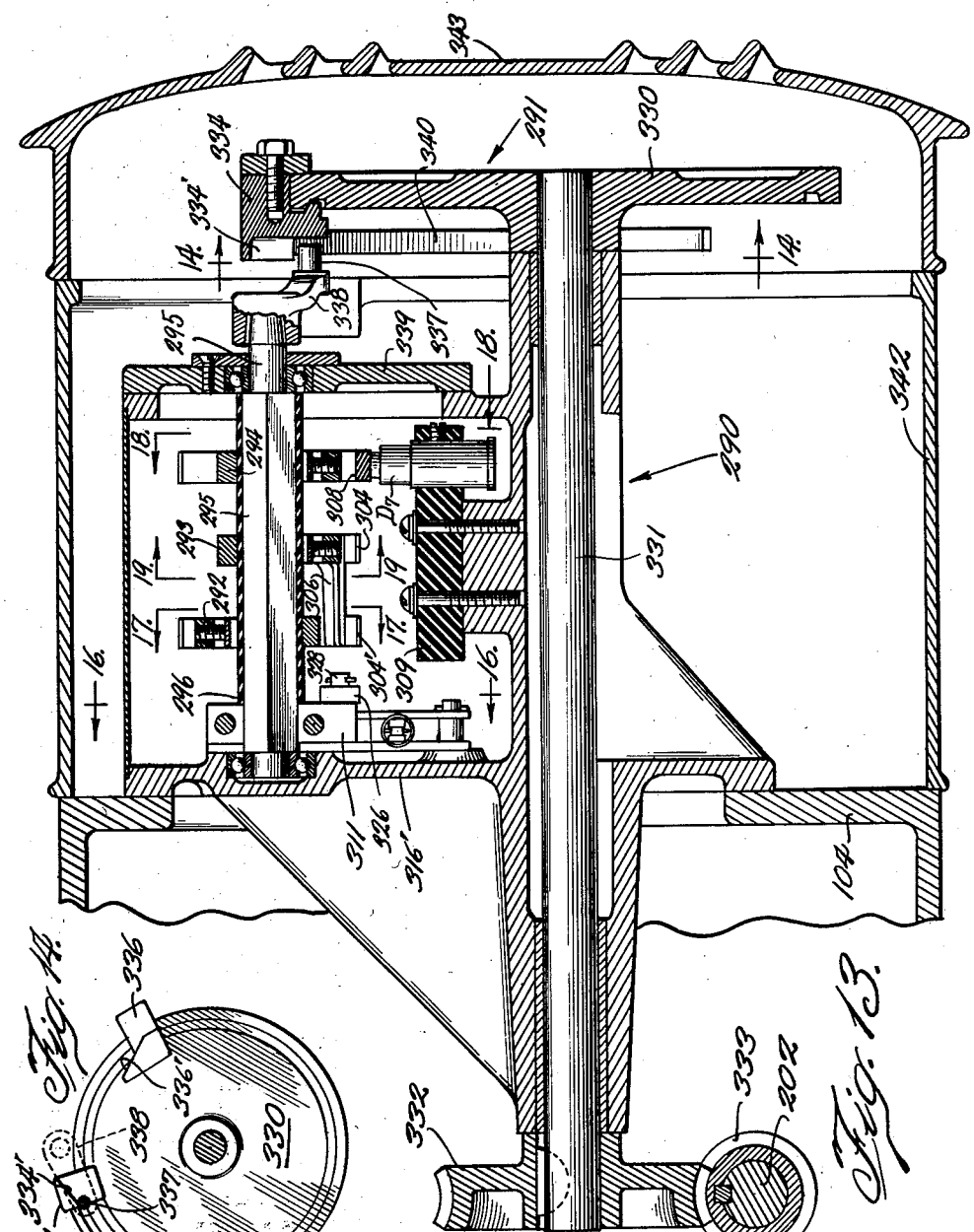
Inventors:
Bengt Granberg &
John B. Sinderson
By Axel A. Hofgren
Atty.

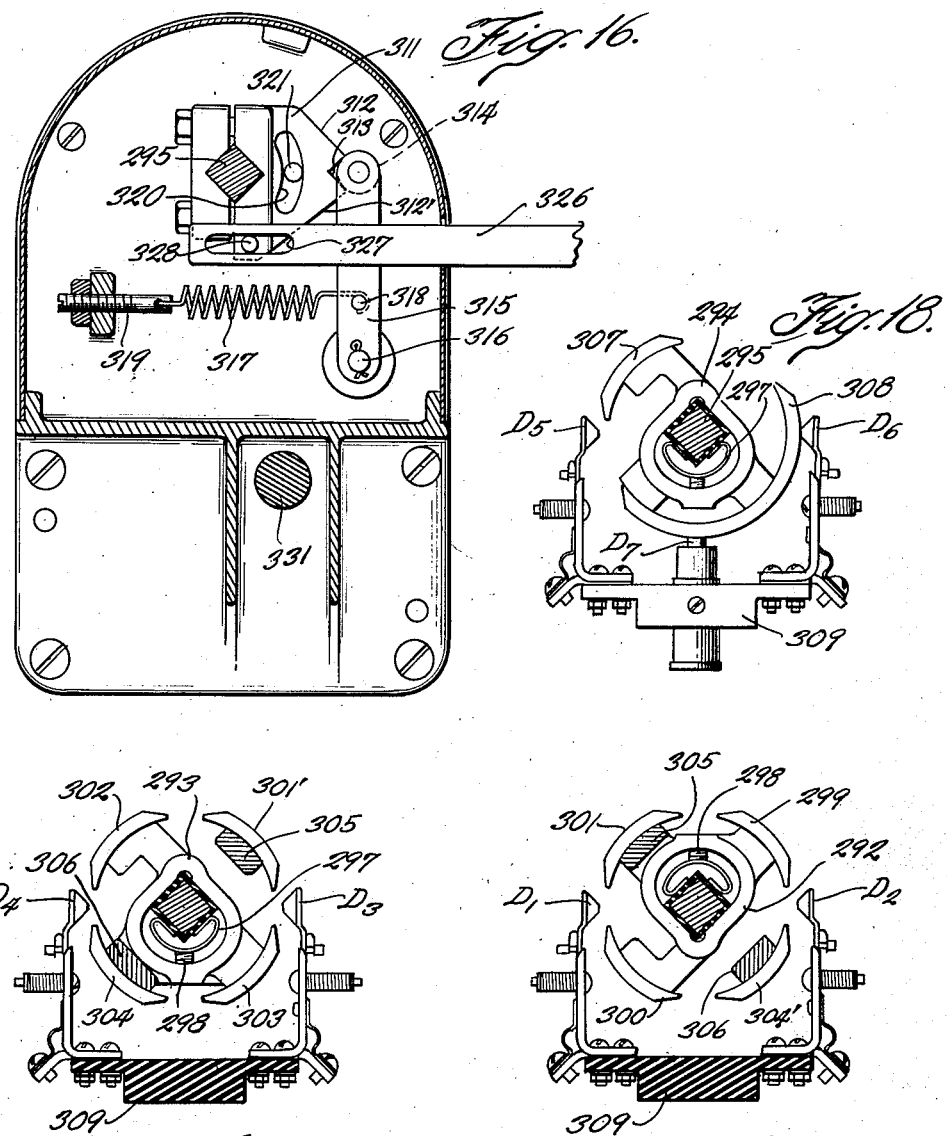

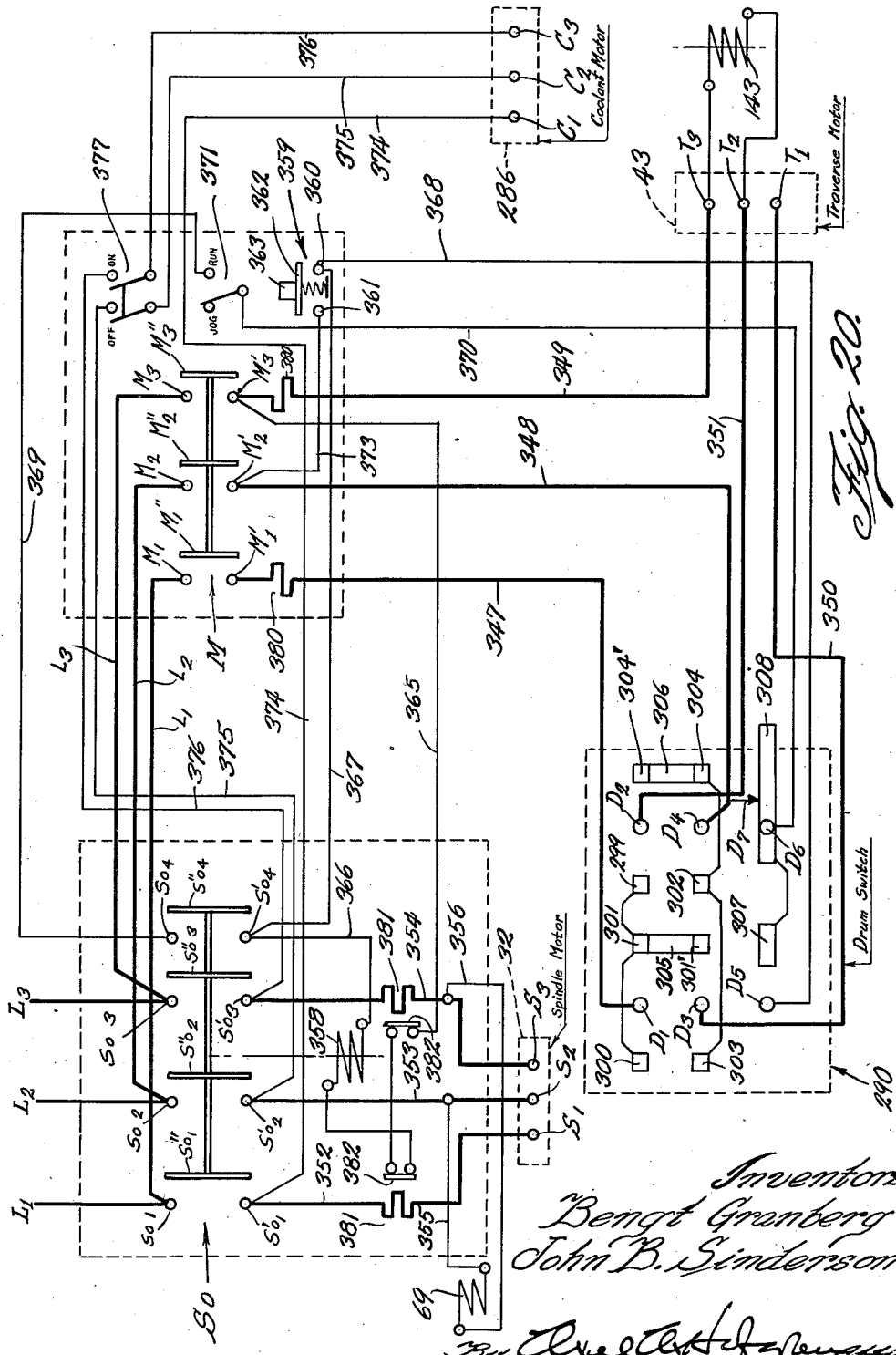

Patented Jan. 24, 1939

2,144,735

UNITED STATES PATENT OFFICE

2,144,735

MACHINE TOOL

Bengt Granberg and John B. Sinderson, Rockford, Ill., assignors to Sundstrand Machine Tool Co., Rockford, Ill., a corporation of Illinois Application February 29, 1936, Serial No. 66,463

55 Claims. (Cl. 82—2)

The invention relates generally to machine tools and more particularly to a lathe, and has as a general object to provide a lathe of novel and improved construction materially speeding up production and adapted for quick set-up and change-over to render the lathe practical and economical for short runs.

Another object is to provide in a lathe, having a front carriage reciprocable longitudinally thereof and a rear carriage adjustable longitudinally thereof and carrying a tool slide, novel and improved drive means for actuating the front carriage at rapid approach, feed and rapid return speeds and for actuating the rear tool slide.

Yet another object is to provide in a lathe, having a front carriage reciprocable longitudinally thereof and a rear carriage adjustable longitudinally thereof and carrying a tool slide, novel and improved drive means for the front carriage and the rear tool slide which is completely and effectively isolated by walls of metal from coolant and chips and is operable to actuate the rear tool slide over a wide range of positions of the rear carriage longitudinally of the lathe and to permit such positioning of the rear carriage without disconnection or adjustment of the drive means for the rear tool slide.

A further object is to provide in a lathe having a carriage, a drive for the carriage including a planetary gearing, a first element of which is driven by the spindle and a second element of which is driven by a rapid traverse motor, a solenoid brake applied upon deenergization of the rapid traverse motor to stop the second element, a detent device adapted to engage a notched portion of the second element to hold the same against rotation, and a governor controlling the detent device permitting engagement thereof only upon cessation of rotation of the second element.

Still a further object is to provide in a lathe of the character described a simplified and improved electrical control readily adjusted to obtain the cycle desired or to change from partial to full automatic control, and prohibiting shift from feed to rapid approach to prevent injury to the work.

Yet a further object is to provide a lathe having a carriage reciprocable longitudinally thereof and hardened and ground steel ways on which the carriage reciprocates, resulting in longer life of the lathe and greater precision in the operation thereof.

Other objects and advantages will become apparent from the following detailed description taken in connection with the accompanying drawings, in which:

Fig. 1 is a front elevational view of a lathe embodying the features of the invention with a portion of the chip pan, the cover for the spindle change gearing, and the cover for the drum switch control removed.

Fig. 2 is a top plan view of the lathe shown in Fig. 1.

Fig. 3 is a left end elevational view of the lathe shown in Fig. 1 with a portion of the cover housing the drive to the spindle broken away to reveal the solenoid brake for the spindle.

Fig. 4 is a diagrammatic view illustrating the driving connections for the spindle, the front carriage and the rear cross slide.

Fig. 6 is a sectional view taken along lines 6—6 of Figs. 1 and 2 to show the construction of the front carriage and cross slide, the rear carriage and cross slide, and the drive for the rear cross slide.

Fig. 7 is a fragmentary rear elevational view of the rear cross slide.

Fig. 8 is a sectional view taken along lines 8—8 of Figs. 1 and 6.

Fig. 9 is a sectional view taken along line 9—9 of Fig. 3.

Fig. 10 is a detailed view of the overload release clutch in the drive to the carriages.

Fig. 13 is a vertical diametrical section of the drum switch control for the lathe.

Fig. 14 is a fragmentary detail view taken along line 14—14 of Fig. 13 showing the dogs mounted on the disk of the drum switch control. The view is on a reduced scale.

Fig. 15 is a fragmentary view showing a modified form of dog to be employed when the control of the lathe is to be completely automatic.

Fig. 16 is a transverse sectional view of the drum switch control taken along line 16—16 of Fig. 13.

Fig. 17 is a transverse sectional view of the drum switch control taken along line 17—17 of Fig. 13.

Fig. 18 is a transverse sectional view of the drum switch control taken along line 18—18 of Fig. 13.

Fig. 19 is a transverse sectional view of the drum switch control taken along line 19—19 of Fig. 13 and looking in a direction opposite to Figs. 16 to 18.

Fig. 20 is a wiring diagram of the electrical connections for the motors and the control means therefor.

Figure 5:
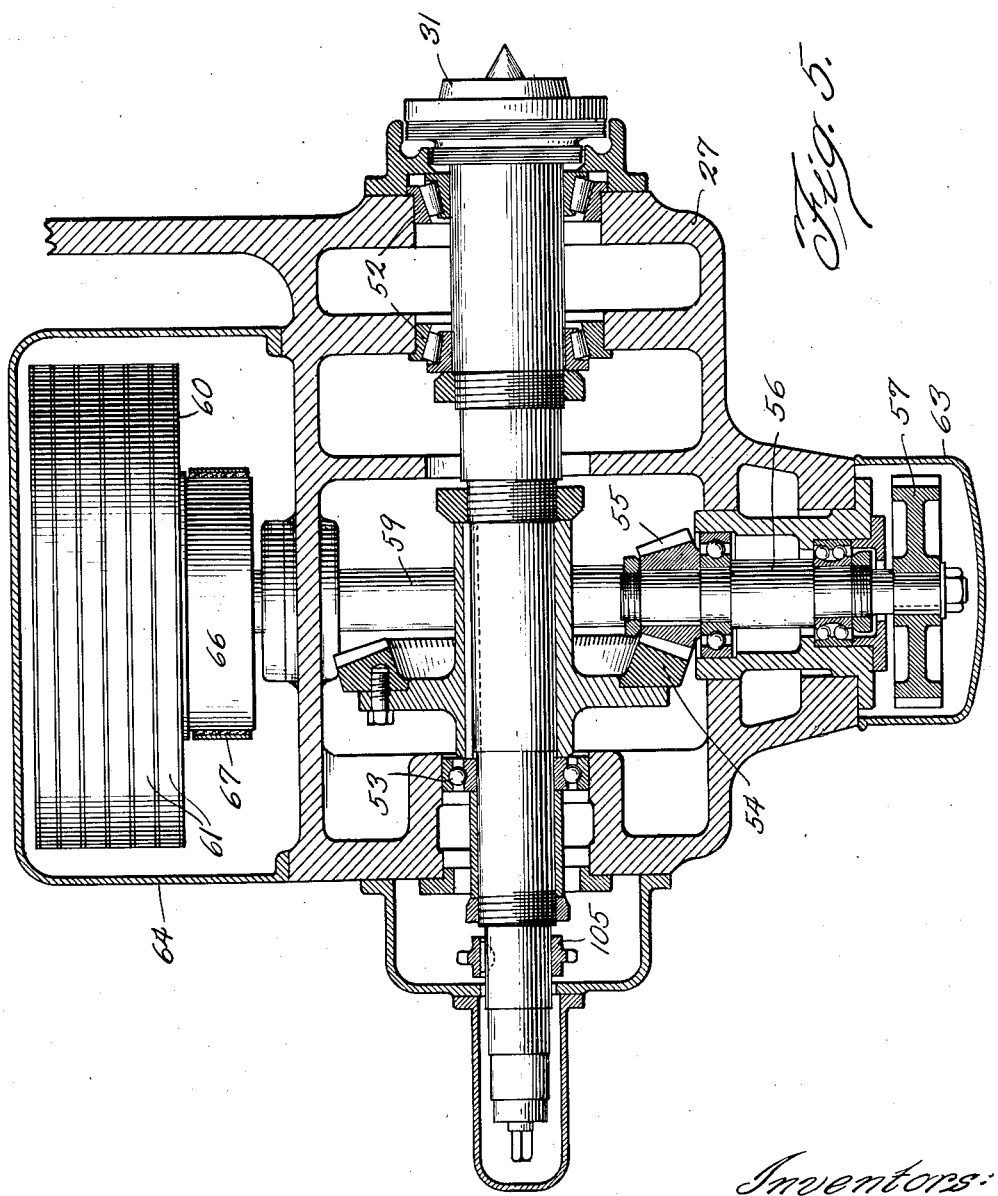
Fig. 5 is a horizontal axial section of the spindle taken along line 5—5 of Fig. 1.

While the invention is susceptible of various modifications and alternative constructions, it is here shown and will hereinafter be described in a preferred embodiment, but it is not intended that the invention is to be limited thereby to the specific construction disclosed, but it is intended to cover all modifications and alternative constructions falling within the spirit and scope of the invention as defined by the appended claims.

General construction

The lathe illustrated in the drawings and hereinafter described for purposes of disclosure comprises generally a base 25, a bed 26 and a headstock 27 at one end of the bed, all formed as an integral part of a single casting, well ribbed to provide strength and rigidity. Also cast integrally with the base and the bed at the juncture thereof is a coolant and chip trough 28 extending around three sides of the lathe. Supported on the trough 28 by means of brackets 29 is a chip pan 30, a section of which at the rear of the lathe is removable to facilitate removal of chips. A spindle 31 driven by an electric motor 32 is rotatably mounted in the headstock 27, and adjustably mounted for movement longitudinally of the bed, opposite the spindle at the other end of the bed, is a tailstock 33. The tailstock has a removable center 34 received in a quill 35 which is clamped or released by a lever 36 and when released is shifted axially by a lever 37. The tailstock is secured in adjusted position by bolts 38.

Reciprocable longitudinally of the bed 26 is a front carriage 39 carrying a cross slide 40 for the support of a tool (not shown). Herein the carriage is driven in a forward direction at traverse and feed speeds and in a return direction at traverse speed by suitable driving means including a planetary gearing generally designated A (see Figs. 4 and 9), and a power unit generally designated B (see Figs. 4, 6 and 8). A first driving element of the planetary gearing is actuated from the spindle 31, while a second driving element of the planetary gearing is actuated by a reversible electric motor 43. To drive the carriage at feed speed the first element is driven by the spindle, while the second element is held against rotation by the motor 43 and more particularly by a rapid traverse brake and detent device shown in Figs. 11 and 12. A rapid traverse movement of the carriage in either direction is obtained with or without rotation of the first element through rotation of the second element in the proper direction by the reversible electric motor 43. Adjustable longitudinally of the bed 26 is a rear carriage 45 supporting a cross slide 46 which is driven from the power unit B in timed relation to the movement of the front carriage.

The lathe is controlled electrically and the parts driven through various cycles of operation without the aid of clutches by starting and stopping of the motors. Such starting and stopping of the motors is partially under the control of a push button station 48 and partially under the control of a drum switch and control generally designated 49. This drum switch control may be adjusted so that the lathe is semi-automatic with each cycle of operation initiated by the operator of the lathe through a lever 50, or so that the operation is continuous and wholly automatic.

Spindle drive

The spindle 31 is journaled at its forward end (Fig. 5) in two tapered roller bearings 52 and at its rear end in a single ball bearing 53, and at that end projects from the headstock. Keyed to the spindle intermediate the bearings is a large beveled gear 54 which meshes with a bevel pinion 55 keyed to one end of a stub shaft 56 projecting at the other end through the front face of the headstock 27. Secured to the projecting end of the stub shaft 56 is a gear 47 meshing with a gear 58 (see Fig. 1) fast on the end of a shaft 59 extending transversely of the headstock and at its other end carrying a pulley 60. The drive for the spindle (Fig. 3) is completed by V-belts 61 running over the pulley 60 and a drive pulley 62 fast on the shaft of the motor 32. Gears 57 and 58 constitute change gears for varying the speed of the spindle 31 and are encased in a cover 63 readily removable to facilitate changing of the gears. The pulleys 60 and 62 and the V-belts are likewise encased in a removable housing 64 in order that the danger of injury to an operator of the machine may be reduced. In order that the tension of the V-belts 61 may be adjusted, the motor 32 is pivotally mounted in well known manner upon a shaft 65 and is retained in the desired position by adjusting screw 65' (see Fig. 2). The motor 32 preferably is protected by a shield 32'.

Herein the spindle 31 is rotated only while the front carriage 39 is moving in a forward direction and is stopped during the return movement of the carriage. In order that the spindle may be quickly brought to rest after reversal of the carriage, there is secured to the shaft 59 a brake drum 66. Encircling the brake drum 66 is a brake band 67 (see Fig. 3) which is applied by a spring 68 and which is released by a solenoid 69. This solenoid, as will become apparent later, is energized to release the brake when the motor 32 is energized and is deenergized to permit the spring 68 to apply the brake when the motor 32 is deenergized.

Front carriage, cross slide and drive

As previously stated, there is reciprocable longitudinally of the bed 26 a front carriage 39. To prolong the life of the machine and to obtain greater precision in operation, the front carriage 39 slides on a hardened and ground steel way 71 secured to the bed 26. The carriage is adjusted and wear compensated for by means of a taper gib 72 and a taper gib 73 (Fig. 6) interposed between vertical and inclined surfaces respectively of the carriage and the way 71.

Supported on the carriage is a cross slide 40 (Fig. 6) adapted to support a tool (not shown). The slide is formed with a longitudinal bore 75 in which is movable a cylindrical member 76. At its inner end, the cylindrical member 76 carries a pin 77 projecting downwardly through a slot 78 formed in the slide and into a groove 79 in the upper face of the carriage 39. At the end projecting into the groove 79, the pin 77 carries a roller 80 adapted to engage a cam bar 81 providing automatic feed-in of the tool. Also disposed in the groove 79 are bars 82 and 83 providing for automatic tool relief at the end of the cut. The cam bar 81 is secured to the bed 26 of the lathe by a bracket 84 (Fig. 1) and the bars 82 and 83 are shifted relative to one another at the beginning and the end of the cut as more particularly described and claimed in the patent to Timothy B. Buell No. 2,002,933, issued May 28, 1935. The roller 80 (Fig. 6) is held in engagement with the cam bar 81 by a compression spring 85 held in place by a rod 86 and at one end abutting the carriage 39 and at the other end abutting a plate 87 secured to the end of the slide 40. Rotatable in the plate 87, but held against axial movement relative thereto, is a micrometer screw 88 threaded into the cylindrical member 76. The projecting end of the micrometer screw 88 is formed to receive a tool and carries a dial 89 to facilitate accurate adjustment of the slide transversely of the carriage by rotation of the screw 88.

Mounted on the carriage 39 and disposed on each side of the slide 40 are plates 90 and 91 (Fig. 2) providing a convenient support for tools or the like.

The carriage 39 is driven at traverse and feed speeds in a forward direction and at traverse speed in a return direction by means which herein includes the differential or planetary gearing generally designated A and the power unit generally designated B. Herein the planetary gearing (Fig. 9) comprises a carrier 95 having teeth 96 formed on the periphery thereof, a sun gear 97 and a sun gear 98 having a slightly larger number of teeth than the gear 97. Meshing with the sun gear 97 are two planet gears 99 each keyed to a short shaft 100 journaled in the carrier 95. Meshing with the sun gear 98 are two planet gears 101 having a slightly smaller number of teeth than the planet gears 99 and each keyed to one of the shafts 100.

One driving element of the planet gearing, herein the carrier 95, is driven, to impart a feed movement to the carriage 39, by the spindle motor 32 through the spindle 31 and suitable gearing generally designated 103 which, with the planetary gearing, is assembled and housed in a casing 104 secured as a unit to the end of the bed of the lathe. The gearing 103 comprises a sprocket wheel 105 keyed to the end of the spindle 31 projecting from the headstock 27 from which a chain 106 drives a sprocket 107 rotatable on a stub shaft 108. Formed integrally with the sprocket 107 is a gear 109 meshing with a gear 110 rotatable on a shaft 111. The gear 110 has teeth 112 on one face thereof so as to form one element of a clutch, the shiftable element 113 of which is formed with complementary teeth and is splined to one end of a shaft 114. The other end of the shaft 114 also is splined and projects from the casing 104 to receive a gear 115 meshing with a gear 116 splined to a shaft 117 which also projects from the casing 104. Keyed to the shaft 117 is a gear 118 meshing with a gear 119 in turn meshing with the teeth 96 of the planetary carrier 95 to complete the drive to the carrier. Gears 115 and 116 constitute change gears and are retained on the shafts 114 and 117 by a removable cover 120. The cover is formed with an aperture 121 opposite the shaft 114 for the insertion into engagement with the shaft 114 of a tool whereby the carriage may be actuated manually when the clutch 113 is disengaged. The arms of a yoke 122 engage a groove 123 formed in the shiftable clutch element 113 and the yoke is fixed by a set screw 124 to a shaft 125 projecting outwardly of the casing 104 and rocked by a lever 126 for manual engagement or disengagement of the clutch 113 (see Fig. 1).

A second driving element, herein the sun gear 97 (Fig. 9), is rotated at a high speed and in either direction by the reversible electric motor 43 to impart a rapid traverse movement to the carriage 39. To that end the sun gear 97 is fast on a shaft 130 which is journaled at 131 in a casting 104' bolted to the casing 104 over an opening therein. At one end the shaft 130 projects through the planetary gear carrier 95 and into a recess in the sun gear 98. The other end of the shaft 130 projects from the casting 104' and is splined to receive a member 132 constituting a pulley 133 and a brake drum 134. The member 132 is retained on the splined end of the shaft 130 by a nut 135. Running in grooves 136 in the pulley 133 are V-belts 137 running in similar grooves formed in a pulley 138 secured to the shaft of the reversible motor 43 (see Fig. 3).

A solenoid brake and a detent device are provided for holding the sun gear 97 against rotation when it is desired to impart a feed movement to the carriage 39. The brake comprises shoes 140 and 141 (see Figs. 11 and 12) pivoted at their lower ends by pins 142 on a portion of the casting 104'. The shoes 140 and 141 are applied to the brake drum 134 by spring pressure and are released by means of a solenoid 143. To that end, the upper end of the shoe 140 is forked to form arms 144 and the shoe 141 likewise is forked to form arms 145. Pivoted between the arms 144 is a block 146 through which projects loosely a threaded rod 147 carrying at its end an adjusting nut 148. Interposed between the nut 148 and the block 146 is a compression spring 149 which provides the force for applying the brake. The other end of the rod 147 is flattened at 147' and projects beyond the arms 145 of shoe 141 and is disposed between angular links 150. The flattened end 147' of the rod 147 is secured to the links 150 by a pin 150' substantially at the bend in the links which is outwardly of the arms 145, while the links 150 in turn are pivoted at their inner ends to the arms 145 and at their outer ends to the core 151 of the solenoid 143 through a swivel plate 152. Disposed underneath the links 150 and the flattened end 147' of the rod 147 is a plate 153 against which abuts one end of a compression spring 154, the other end of which is received in a socket 155 formed in the brake shoe 141 and serves to lift the core 151 when the solenoid is deenergized. In order that downward movement of the core 151 of the solenoid, as viewed in Fig. 12, may serve to release the brake, the rod 147 carries nuts 156 which engage the block 146 to swing the shoes 140 and 141 outwardly against the action of the spring 149.

The braking torque required to bring sun gear 97 to rest in the change from traverse to feed is not excessive and may be supplied by a friction brake of moderate size. However, when cut of the tool during feed movement commences, the torque tending to rotate gear 97 is extremely high. In order that with a friction brake of moderate size the sun gear 97 may be held against rotation under that condition, the mechanical detent device is provided for aiding and supplementing the brake after the gear has been brought to rest. To that end there is mounted on the member 132 an annular ring 160 held against rotation relative to the member by a pin 161. The periphery of the annular ring 160 is formed with notches 162 with which is engageable a pawl 163 pivoted at 164 on a lug of the casting 104'. The pawl is urged to engaged position, shown in Figs. 9 and 12, by a tension spring 165 at one end engaging a pin extension 166 of the pawl and at the other end adjustably anchored by a screw 167. The pawl 163 is pivoted at its disengaged position, shown in Fig. 11, and in dotted outline in Fig. 12, by an extension of a pin 168 projecting over the rear end of pawl 163. Pin 168 extends through links 150 and plate 152 pivotally to connect the same and is thus moved downwardly when solenoid 143 is energized. As will become apparent with the description of the electric circuits of the lathe, the solenoid 143 is connected in parallel with the motor 43 so as to be energized when the motor is energized and thus serves to release brake snoes 140 and 141 and also withdraw pawl 163 when the motor 43 is energized.

Figure 11:
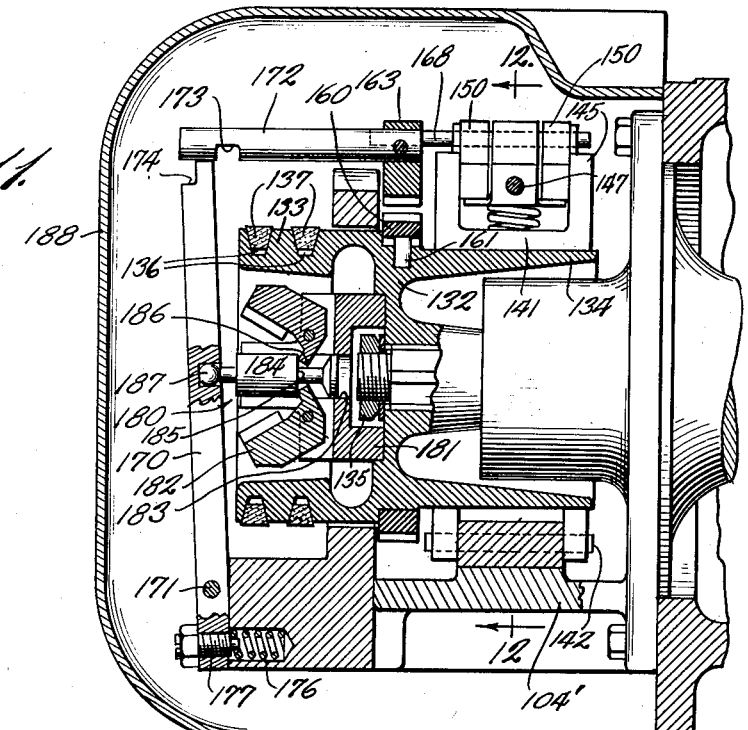
Fig. 11 is a diametrical section taken along line 11—11 of Fig. 12 showing the rapid traverse brake and detent device slightly enlarged over and in a different position from that shown in Fig. 9.
Figure 12:
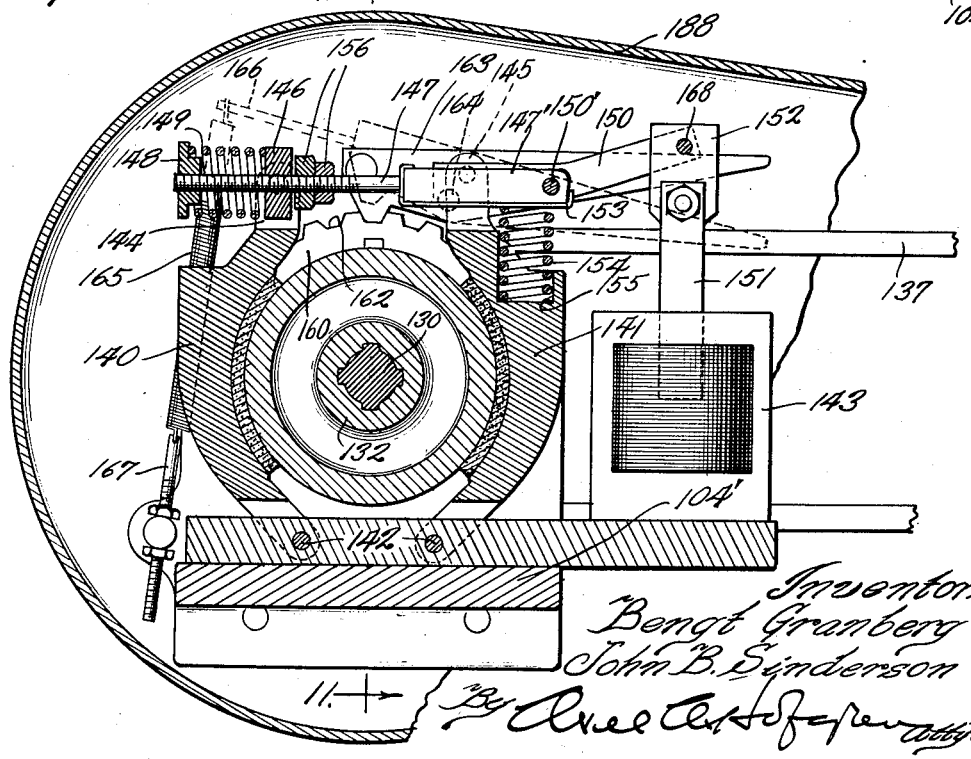
Fig. 12 is a sectional view taken along line 12—12 of Fig. 11.

In order that pawl 163 may not engage a notch 162 before the member 132 has stopped rotating, means responsive to rotation of the member 132 is provided herein for maintaining pawl 163 in disengaged position after deenergization of the solenoid 143 and prior to cessation of rotation of the member 132. This means comprises a latch 170 pivoted near its lower end on a pin 171 and at its upper end disposed below a pin 172 projecting from the pawl 163. The pin 172 has a notch 173 and the latch 170 likewise has a notch 174 so that in one position of the latch 170 the finger 172 rests on the end of the latch, as shown in Fig. 11, thereby holding the pawl out of engagement with the notches 162. In another position, the end of the latch 170 is received in the notch 173, as shown in Fig. 9, permitting finger 172 to drop and the pawl 163 to engage a notch 162. The latch is urged to the position shown in Fig. 9, that is with its end in notch 173, by a compression spring 176 abutting an adjusting plug 177 carried by the latch 170 at its lower end.

During rotation of the member 132, the latch 170 is held in pawl-disengaged position against the opposition of the spring 176 by a centrifugal governor generally designated 180 carried by the member 132. The governor comprises a body 181 secured to the member 132 and diametrically oppositely disposed weights 182 pivoted to the body 181. Slidable in a bore 183 in the body is a plunger 184 having a groove 185 into which fingers 186 of the centrifugal weights 182 project to move the plunger outwardly of the bore when the weights are swung radially outwardly by rotation of the member 132. The plunger 184 engages a ball 187 carried by the latch 170 intermediate its ends. The tension of spring 176 is so adjusted that it is overcome by the weights 182 so long as there is any rotation of the member 132. In that manner the upper end of the latch 170 is held outwardly by the centrifugal governor so long as there is any rotation of the member 132, thereby assuring that the pawl 163 does not engage a notch 162 before cessation of rotation, which would cause great shock and perhaps injure the lathe. The traverse motor 43, the belts 137 leading to the member 132 and the solenoid brake, detent device and control mechanism therefor are all encased in a removable cover 188 secured to the casing 104.

The driven element of the planetary gearing, herein the sun gear 98, is formed integral with a shaft 190 terminating in a reduced threaded end 191 projecting into the bed 26 of the lathe. Keyed to the shaft 190 intermediate its ends (see Fig. 10) is one element 192 of an overload release, the other element 193 of which is formed on the end of a sleeve 194 loose on the shaft 190. The elements 192 and 193 are normally retained in engagement with one another by a compression spring 195, at one end abutting the sleeve 194 and at the other end abutting a collar 196 which is mounted on ball bearings 197 and is adjustable axially of the shaft by lock nuts 198 to vary the load at which the release disengages. Formed on the sleeve 194 is a gear 200 which meshes with a gear 201 keyed to a shaft 202 parallel with the shaft 190 and also projecting into the bed 26 of the lathe. The overload release and the gears 200 and 201 are enclosed in a small housing 203 bolted to the casing 104 and projecting through an aperture 204 formed in the end wall 205 of the bed 26 for that purpose.

As previously stated, the drive for the front carriage 39 includes a power unit B which comprises (see Figs. 6 and 8) a short shaft 207 extending transversely of the lathe. The shaft 207 is journaled in the walls of a box-like housing 208 adapted to be inserted into the bed of the lathe through an opening 209 in the front wall 210. The housing is formed in part by a plate 211 adapted to be removably secured over the opening 209 by bolts 211'. One end of the shaft 207 projects outwardly through the plate 211 and is formed with a pinion 212 meshing with a rack bar 213 secured by bolts 213' to the bottom of the front carriage 39. The other end of the shaft 207 projects through and is journaled in a wall 208' of the housing 208 and this wall is formed with a hub portion 214. Keyed to the shaft 207 is a worm wheel 220 and meshing therewith is a worm 221 fast on a shaft 222 projecting outwardly of the housing 208. The end of the shaft 222 projecting outwardly of the housing 208 carries one element of a universal joint 223, the other element of which is secured to a shaft 224 having a splined end 225. Completing the drive is a sleeve 226 slidable over the splined end 225 of the shaft 224 and secured to one element of a universal joint 227 the other element of which is carried by the shaft 202. Access to the universal joint 227 is provided through an opening 228 in the bed 26 concealed by a removable cover 229, and access to the universal joint 223 is had through an opening 230 in the plate 211 overlapping the opening 209 and concealed by a removable cover 231. The power unit runs in a bath of oil contained in the housing 208 and preferably a sight oil gage 232 is provided in the plate 211 to indicate the level of the oil in the housing.

It will be apparent from a consideration of Figs. 6, 8 and 9 that the ribbing in the casting forming the bed is employed not only to provide strength, but to shield the drive for the front carriage from coolant and chips. In the present construction, the drive for the front carriage is completely isolated from coolant and chips by solid walls of metal including end wall 205, front wall 210 and rear wall 237 of the bed, a wall 238 separating the headstock from the bed, and a reinforcing rib 239 (see Figs. 6 and 8). The rib 239 opposite the power unit B has a portion 239' inclined downwardly and inwardly from the upper front edge of the bed to the housing 208, a portion 239'' extending around the housing and outwardly to the front wall 210, and a vertical portion 239''' extending laterally to the rear wall 237 and from the wall 238 to the bottom of the bed. This rib is formed with an aperture 241 through which projects one end of the shaft 207 and in which is piloted the hub portion 214 of the housing 208 in which the shaft 207 is journaled. The portion of the opening 209 not closed by the plate 211 is effectively closed by the carriage 39.

Rear carriage, cross slide and drive

Manually slidable longitudinally of the bed on ways (Fig. 6) 250 and 251 is the rear carriage 45 secured in adjusted position by bolts 252 and having a horizontal portion 45' and a depending vertical portion 45". Slidable transversely of the carriage 45 (Fig. 7) on a generally T-shaped guideway 253 is the cross slide 46. At the ends of its horizontal portion the T-shaped guideway has inclined guide surfaces 254. The cross slide 46 has complementary inclined surfaces 255 and in addition has rectangular portions 256 with guide surfaces thereon projecting beneath the ends of the horizontal portion of the T-shaped guideway. Interposed between one of the inclined guide surfaces 254 on the guideway and a complementary surface 255 on the slide is an adjustable tapered gib 257 for initially adjusting the cross slide and for compensating for wear of the guideway. With the guide surfaces formed and the gib located as here shown, a single gib serves to maintain all complementary sliding surfaces in close contact.

Secured as by bolts 260 to the rear end of the slide 46 is a plate 261 in which is journaled a micrometer screw 262 threaded into a bore 263 in a block 264. This block is releasably secured beneath the slide 46 by means of a bolt 265 threaded into a T-nut 266 in a transverse T-slot 267 in the upper surface of the block. At its outer end, the screw 262 carries a vernier dial 268 and is formed for the reception of a tool for rotating the screw to adjust the slide 46 relative to the block 264.

The cross slide 46 is reciprocated transversely of the lathe in timed relation to the movement of the front carriage 39. To that end there is secured beneath the block 264 a roller 270 projecting into a cam groove 271 formed in the periphery of a drum cam 272. The cam is keyed to a shaft 273 journaled in the rear carriage transversely thereof and fast on the outer end of the shaft is a gear 274 meshing with a gear 275 fast on the outer end of a short parallel shaft 276. The gears 274 and 275 constitute change gears and are removably retained on the ends of shafts 273 and 276 by a cover 277 removably secured to the rear carriage. The inner end of the shaft 276 has secured thereto one element of a universal joint 279, the other element of which is secured to a sleeve 280. Completing the drive from the power unit B to the rear cross slide is a shaft 281 which at one end is splined to be received within the sleeve 280 and at the other end carries one element of a universal joint 282, the other element of which is carried by the shaft 207 of the power unit.

It will be apparent that by the provision of two universal joints in the drive connection from the power unit to the rear cross slide, the rear carriage may be adjusted to any position longitudinally of the bed without change or disconnection of the drive to the rear cross slide. The splined connection between the shaft 281 and the sleeve 280 enables the power unit B, after disconnection of the universal joint 223 from shaft 222, to be removed as a unit by simply pulling the same out of the bed of the lathe.

Like the drive to the front carriage, the drive to the rear cross slide is also completely isolated from coolant and chips. As best seen in Figs. 6 and 8, the shaft 281 is disposed in a conical housing formed by a rib 283 extending from the rib 239 to the rear wall of the bed. The rib merges at its top with the portion of the bed on which the ways 250 are formed. As best seen in Fig. 8, the housing formed by the rib 283 diverges from the front to the rear of the lathe enabling the rear carriage to be adjusted to either side of the position shown, as indicated by the dotted outlines of the shaft 281. The depending portion 45" of the rear carriage effectively closes the opening in the rear wall through which the shaft 281 projects.

Coolant is supplied to the tools by a pump 285 (see Figs. 2 and 3) driven by an individual electric motor 286. The pump is of the centrifugal type and is connected directly to the base 25 of the lathe which is recessed and has a drain opening 287 to collect the coolant and return the same to the pump. In this manner the only piping required is that leading from the pump to the tool.

Control

Herein the front carriage 39 is operated through a cycle of rapid approach, feed and rapid return and each such cycle may be initiated by the operator, or the cycles may be automatically repeated. A rapid approach movement of the front carriage is obtained by actuation of both the spindle motor 32 and the rapid traverse motor 43, while a feed movement is obtained by actuation of the spindle motor only, and rapid return is obtained by actuation of the rapid traverse motor only in a reverse direction. The rear cross slide, as previously stated, is actuated in timed relation to the reciprocation of the front carriage and the character of the movement imparted thereto is determined by the change gears 274 and 275 and by the shape of the cam groove 271.

Electrical control means is provided for governing the operation of the lathe and comprises a drum switch (Fig. 13) generally designated 290, partially under the control of the operator of the lathe through the lever 50 and partially under the control of means 291 driven in timed relation to the movement of the front carriage, and a push button station 48 for conditioning the electrical circuits. The push button station 48 and the drum switch 290 are best shown in Figs. 1 and 13 to 19, while Fig. 20 is a diagrammatic showing of the control means, to which figures reference will be made in the following description of the control means.

The drum switch 290 directly controls the current to the rapid traverse motor 43 and governs the control current for the stopping and starting of the motor 32. To that end the switch comprises three metallic contact brackets 292, 293 and 294 mounted in axially spaced relation on a square shaft 295. The shaft is encased in insulation 296 and the brackets are mounted on the shaft with one corner thereof received in a V-shaped portion of each bracket and retained in that position by a spring 297 tensioned by a screw 298. Bracket 292 is formed with diametrically oppositely disposed single segmental contact shoes 299 and 300, and double segmental contact shoes 301 and 301' disposed between the contacts 299 and 300. Bracket 293 likewise is formed with diametrically oppositely disposed segmental contact shoes 302 and 303 and with double segmental contact shoes 304 and 304' disposed between shoes 302 and 303. Contact shoe 301 lies in the plane of shoes 299 and 300, while shoe 301' is carried by a forward extension 305 and lies in the plane of shoes 302 and 303 of bracket 293. Shoe 304 of bracket 293 also is disposed in the plane of shoes 302 and 303, while shoe 304' is carried on a rearward extension 306 and lies in the plane of shoes 299 and 300. The shoes 301 and 301' of bracket 292 are disposed diametrically opposite shoes 304 and 304' of bracket 293. Bracket 294 has formed thereon a single segmental contact shoe 307 of the same length as the shoes on the other brackets and a shoe 308 forming practically a semicircle. Disposed in the plane of each of the brackets at diametrically opposite points and at the height of the axis of the shaft 295 are two spring contacts $D_1$, $D_2$, $D_3$, $D_4$, $D_5$ and $D_6$ supported on an insulated base 309. Also disposed in the plane of the bracket 294 and below the bracket is a contact $D_7$.

The switch has three positions, namely, an intermediate neutral or feed position which is the position in which the switch and the brackets are shown in the drawings; a rapid approach position which is assumed when the switch is rocked through 30° in a counter-clockwise direction, as viewed in Figs. 16 to 18; and a rapid return position which is assumed when the switch is rocked through 30° from intermediate position in a clockwise direction. The switch is yieldably retained in its various positions by means of a star wheel 311 (see Fig. 16) fast on the shaft 295. Formed on the star wheel are two converging cam surfaces 312 and 312', and at the point of convergence of the cam surfaces is a notch 313. Disposed to ride on the cam surfaces or drop into the notch 313 is a roller 314 carried on the end of a link 315 pivoted at its other end on a pin 316 projecting from the rear wall of the drum switch housing 316'. The roller 314 is urged into contact with the star wheel by a tension spring 317 at one end hooked over pin 318 on the lever 315 and at the other end anchored in an adjusting screw 319. When the roller 314 engages the notch 313 the switch is yieldably held in intermediate neutral or feed position. When the switch is rocked counter-clockwise, as viewed in Fig. 16, wheel 314 rides on the cam surface 312' and assures movement of the switch to the limit permitted by engagement of an arcuate slot 320, formed in the star wheel, with a pin 321 fixed in the rear wall of the switch and projecting into the slot. Likewise when the switch is rotated in a clockwise direction the roller 314 rides on the cam surface 312 and assures movement of the switch in the opposite direction to the extent permitted by the slot 320.

The switch may be rocked manually by the operator of the lathe or automatically by means driven in timed relation to the movement of the front carriage 39. Manual rocking of the switch is employed primarily only to rock the switch to rapid approach position for initiating a cycle of operation of the lathe and for rocking the switch to rapid return position to withdraw the tool and stop the lathe should the operator find it desirable in order to prevent injury to the machine or the work. Such rocking is effected by the lever 50 pivoted on a vertical axis in front of the headstock where it is readily accessible to the operator. Extending rearwardly from the lever 50 is an arm 325 connected to one end of a link 326 terminating at its other end in a slot 327 in which is received a pin 328 on the star wheel 311. The lever 50 is movable to an extent necessary to rock the switch to either rapid approach or rapid return position, yet the pin and slot connection with the star wheel 311 permits rocking of the switch by the automatic means without imparting a corresponding movement to the lever 50.

Herein the means for rocking the switch automatically in timed relation to the movement of the front carriage 39 takes the form of a disk 330 fixed on the forward end of a shaft 331 extending parallel with the shaft 295 of the switch. The rear end of the shaft 331 has keyed thereto a worm wheel 332 meshing with a worm 333 keyed to the shaft 202 constituting a part of the drive to the front carriage (see Fig. 9). Adjustably mounted on the periphery of the disk 330, which is graduated to facilitate the spacing, are a dog 334, a dog 335 and a dog 336. Disposed to be acted upon by the dogs in the rotation of the disk 330 is a pin 337 projecting from an arm 338 fixed to the end of the shaft 295 projecting through the front wall 339 of the drum switch housing. The dog 334 has a cam surface 334' which engages the pin 337 to rock the switch from rapid approach to intermediate position. Dog 335 has a cam surface 335' which engages the pin 337 to rock the switch from intermediate to rapid return position and dog 336 has cam surface 336' which engages the pin to rock the switch from rapid return to intermediate position. As will become apparent with a description of the electrical circuit of the lathe, the drum switch is so connected that when shifted from rapid approach to intermediate position a feed movement is imparted to the front carriage while when the switch is rocked to intermediate position from rapid return the front carriage is brought to rest. Connected between the dog 334 and the dog 335 is an arcuate bar 340 which overlies the pin 337 and prevents rocking of the switch either manually or automatically from feed to rapid approach position, while the front carriage 39 is within the limits of feed movement as defined by the spacing of dog 334 and the dog 335 thereby assuring that the work or the machine will not be injured by a sudden thrust of the tool into the work.

With the dog 336 formed as shown in Fig. 14, that is to rock the switch from rapid return to intermediate or neutral position, the lathe is stopped at the end of each cycle of operation and is manually restarted through the lever 50. Should it be desirable to have continuous operation of the machine with the cycles repeated, this is readily accomplished by substituting for the dog 336 a modified dog 341 shown in Fig. 15. The dog 341 has a cam surface 341' which engages pin 337 and rocks the switch from rapid return through neutral to rapid approach position. Thus it is seen that with the control here shown the lathe is readily converted from a semi-automatic to a full automatic machine. Furthermore, just as the dog 341 might be substituted for the dog 336 to effect such conversion of the machine, new dogs might also be substituted for dogs 334 or 335 or additional dogs added to obtain a cycle of operation different from the one here described. All dogs are readily adjusted circumferentially of the disk 330 accurately to control the time of reversal or change of speed. The switch and the disk are attached as a unit to the casing 104 and are enclosed in a housing 342 having a removable cover 343.

The push button station 48 conditions the electrical circuit of the lathe and includes a manual switch generally designated M (see Fig. 20) having stationary terminals $M_1$ and $M'_1$, $M_2$ and $M'_2$, $M_3$ and $M'_3$ and movable blade contacts $M''_1$, $M''_2$ and $M''_3$ adapted to bridge pairs of the stationary terminals. The switch M is positioned in closed or run position by depressing a button 345 on the push button station 48 and in open or safe stop position by depressing a button 346. Terminals $M_1$, $M_2$ and $M_3$ of the switch M are connected to line wires $L_1$, $L_2$ and $L_3$ respectively. Terminal $M'_1$ is connected by a lead 347 to contact $D_1$ of the drum switch and terminal $M'_2$ is connected by lead 348 to contact $D_4$ and contact $D_7$ of the drum switch. Terminal $M'_3$ is directly connected by lead 349 to terminal $T_3$ of the traverse motor 43. Of the remaining terminals of the traverse motor, $T_1$ is connected by lead 350 to contact $D_3$ of the drum switch and $T_2$ is connected by lead 351 of contact $D_2$. Solenoid 143 for releasing the rapid traverse brake is connected in parallel across terminals $T_2$ and $T_3$ of the traverse motor. It will be apparent from the foregoing that brackets 292 and 293 of the drum switch and the contact shoes thereon exclusively govern the current to the rapid traverse motor. With the drum switch rocked to rapid approach position, contacts $D_1$ and $D_3$ are bridged by shoes 301 and 301' and extension 305 to connect $T_1$ to $L_1$ and contacts $D_2$ and $D_4$ are bridged by shoes 304 and 304' and extension 306 to connect $T_2$ to $L_2$. When the drum switch is rocked to rapid return position bracket 292 through shoes 300 and 299 bridges contacts $D_1$ and $D_2$ to connect $T_2$ to $L_1$ and bracket 293 through shoes 303 and 302 bridges contacts $D_3$ and $D_4$ to connect $T_1$ and $L_2$ and thus cause traverse motor 43 to rotate in reverse direction.

Energizing current for the spindle motor does not flow through the drum switch but the spindle motor nevertheless is controlled by the drum switch. This is the function of the bracket 294 and the shoes thereon which govern control current for a solenoid actuated switch generally designated So. This switch has pairs of stationary terminals $So_1$ and $So'_1$, $So_2$ and $So'_2$, $So_3$ and $So'_3$, and $So_4$ and $So'_4$ and movable contact blades $So''_1$, $So''_2$, $So''_3$ and $So''_4$. Terminals $So_1$, $So_2$ and $So_3$ are connected respectively to line wires $L_1$, $L_2$ and $L_3$. Terminal $So'_1$ is connected by lead 352 to terminal $S_1$ of the spindle motor 32; terminal $So_2$ is connected by lead 353 to terminal $S_2$ and terminal $So'_3$ is connected by lead 354 to terminal $S_3$ of the spindle motor. Connected in parallel with the terminals $S_2$ and $S_3$ of the spindle motor by leads 355 and 356 is the solenoid 69 for releasing the spindle brake.

Switch So is biased to open position and is held closed by the energization of a solenoid 358. Current may be supplied to energize the solenoid either through the drum switch 290 or through a push button switch 359, incorporated in the station 48, having stationary terminals 360 and 361 and a movable bridging contact 362 biased to open position and closed by depression of a button 363 on the push button station 48. To that end one terminal of solenoid 358 is connected by a lead 365 to the terminal $M'_3$. The other terminal of solenoid 358 is connected by a lead 366 to the terminal $So'_4$ thence by lead 367 to contact 360 of the push button switch 359 and from there by lead 368 to contact $D_5$ of the drum switch. Thus upon rocking of the drum switch to rapid approach position after closure of the manual switch M a circuit is established from $L_3$ through the solenoid 358, leads 366, 367 and 368 to contact $D_5$ of the drum switch which is connected by bracket 294 through shoes 307 and 308 to contact $D_7$ connected by lead 348 through switch M to $L_2$ to complete the circuit. With the solenoid 358 energized by completion of the circuit above described, the switch So is closed and a holding circuit established in parallel with contact $D_5$ through blade $So''_4$, terminal $So_4$, a lead 369 and a lead 370 connected to contact $D_6$ of the drum switch which through shoe 308 is connected to contact $D_7$. Connected between leads 369 and 370 is a switch 371 actuated by a button 372 on the push button station 48 and having a closed or run position and an open position for jogging the spindle, as will be described presently.

In order that the spindle may be driven without also starting the rapid traverse motor, a lead 373 is connected between terminal $M'_2$ of the manual switch M and contact 361 of the push button switch 359. Thus even with drum switch 290 in neutral position the spindle motor may be started by depressing button 363. This completes a circuit from $L_2$ through manual switch M, lead 373, push button switch 359, leads 367 and 366, solenoid 358 and lead 365 through manual switch M to $L_3$ whereby the solenoid 358 is energized and the switch So closed. If switch 371 is in closed or run position, closure of the switch So again completes the holding circuit through contact blade $So''_4$ and contacts $D_6$ and $D_7$ of the drum switch as previously described. However, if switch 371 is in open or jogging position, the holding circuit will not be established and the spindle motor will run only so long as the button 363 is held depressed. In this manner the spindle may be jogged and the carriage of the lathe inched forward.

Terminals $C_1$, $C_2$ and $C_3$ of the coolant motor 286 are connected respectively to terminals $So'_1$, $So'_2$ and $So'_3$ of the spindle switch by leads 374, 375 and 376. Interposed in the leads 375 and 376 is a switch 377, controlled by a button 378 on the station 48 and having an open and a closed position. Interposed in each of the leads 347 and 349 is a current limiting device 380 and interposed in each of the leads 352 and 354 is a current limiting device 381 each having a switch 382 connected in series with the solenoid 358.

*Operation*

The operation of the lathe is briefly as follows: Switch 377 is first closed and switch 371 also positioned in closed or run position. To start the machine, the operator then depresses run button 345 which closes manual switch M and then through lever 50 rocks drum switch 290 to rapid approach position. This completes a circuit through contacts $D_1$ and $D_3$, and $D_2$ and $D_4$ of the drum switch to rapid traverse motor 43 and the solenoid 143 of the rapid traverse brake. Upon energization of the solenoid 143, core 151 thereof is pulled downwardly (see Fig. 12) and through links 149 and rod 147 releases brake shoes 140 and 141, and through pin 168 disengages pawl 163 from notches 162 of the annular ring 160. This frees the member 132 permitting the same to be rotated in a forward direction by the rapid traverse motor 43. Simultaneously an energizing circuit for the solenoid 358 of the spindle switch is completed from $L_2$ through lead 348, contact $D_7$, bracket 294, contact $D_5$, leads 368, 367 and 366, solenoid 358 and lead 365 to $L_3$. This closes the spindle switch So to complete a circuit to the spindle motor 32 and the solenoid 69 whereby the spindle brake is released and the spindle driven by the motor 32. With both the spindle motor 32 and the rapid traverse motor 43 rotating, the front carriage 39 is rapid traversed toward the work by the action of the planetary gearing A and the power unit B. Rear cross slide 46 is also approached toward the work at a rate dependent upon the change gears 274 and 275 and the shape of the cam groove 271. Closure of the spindle switch So also energizes the coolant motor 286 to drive the coolant pump 285.

Driven from shaft 202 of the drive to the front carriage to rotate therewith at a speed and in a direction corresponding to the speed and direction of the carriage movement is disk 330. Just prior to engagement of the tool, carried by the front carriage, with the work, dog 334 mounted on disk 330 engages pin 337 and rocks drum switch 290 to intermediate position which herein constitutes a feed position. By such rocking of the drum switch the circuit to the rapid traverse motor 43 and the solenoid 143 is broken permitting spring 149 to apply brake shoes 140 and 141 and bring rapid traverse motor 43, and particularly sun gear 97, to rest. Pawl 163, however, does not engage a notch 162 even though released by pin 168 until the member 132 is completely at rest. This is prevented by latch 170 which is held out of engagement with the notch 173 in pin 172 until centrifugal weights 182 (see Fig. 11) are swung radially inwardly which occurs when the member 132 is brought to a complete stop. Such rocking of the drum switch to feed position, however, does not arrest spindle motor 32 because closure of the switch So had established a holding circuit through the contact blade $So''_4$, lead 369, switch 371, lead 370, contact $D_6$ and shoe 308 to contact $D_7$. As a result the carriage is driven at a feed speed by the spindle motor 32 through the planetary gearing A and the power unit B. During feed movement of the carriage, the drum switch is prevented from being shifted to rapid approach position either intentionally or unintentionally by the arcuate bar 340 which overlies the pin 337 and permits the switch to be rocked only to rapid return position.

After the tool mounted on the carriage 39 has completed its cut, dog 335 on the control disk 330 engages pin 337 and rocks drum switch 290 from its feed position to rapid return position. This breaks the holding circuit for the solenoid 358 through the contact $D_6$ and shoe 308 to stop the spindle motor 32 as well as the coolant motor 286. At the same time bracket 292 of the drum switch through contact shoes 300 and 299 connects contacts $D_1$ and $D_2$ to connect terminal $T_2$ of the rapid traverse motor to line $L_1$ and bracket 293 through shoes 303 and 302 connects contacts $D_3$ and $D_4$ to connect terminal $T_1$ of the traverse motor to line wire $L_2$ thereby causing the traverse motor to rotate in reverse direction. The solenoid 143 of the rapid traverse brake is of course again energized to release the brake and withdraw pawl 163 and the front carriage 39 is then returned to initial position at a traverse rate. Rear cross slide 46 being driven from the power unit B is of course also returned to initial position.

During return movement of the carriage 39, disk 330 also is driven in a reverse direction and the carriage continues its rapid return movement until dog 336 engages pin 337 again to rock switch 290 to its intermediate position which this time is a neutral position. In this position of the switch the circuit to the rapid traverse motor and the solenoid 143 is broken to bring the motor and the sun gear 97 to rest. The spindle motor is already at rest during the return movement of the carriage and is not reenergized by the engagement of shoe 308 with contact $D_6$ forming a part of the holding circuit for the solenoid 358. A cycle of operation has thus been completed and a new cycle is initiated under the control of the operator as previously described by rocking the drum switch to rapid approach position through the lever 50.

Should it be desirable to repeat the cycle automatically, this may be done by substituting for the dog 336 the dog 341, shown in Fig. 15. This dog is shaped so that upon engagement thereof with the pin 337 the drum switch is rocked from rapid return through neutral to rapid approach position, thereby initiating the cycle above described. With the cycle automatically repeated the lathe is started by depressing run button 345 on the push button station and is stopped by depressing safe stop button 346.

The spindle motor may be driven independently of the rapid traverse motor by depressing button 363 on the push button station. This completes a circuit from $L_2$ through the manual switch M, lead 373, switch 359, leads 367 and 366 to solenoid 358 and through lead 365 and the manual switch M to line wire $L_3$. If the switch 371 is in run or closed position, a holding circuit for the solenoid 358 is established through contact blade $So''_4$, leads 369 and 370, contact $D_6$, shoe 308 and contact $D_7$ of the drum switch and lead 348 through the manual switch to $L_2$. While running in this manner the spindle 31 may be employed to drive the carriage at feed speed or it may be disconnected from the carriage by shifting clutch 113 through lever 126. If on the other hand switch 371 is in open or jogging position, the holding circuit for the solenoid 358 will not be established and the spindle motor 32 will then run only so long as the button 363 is held depressed. In this manner by manipulation of the button the spindle may be inched forward under the immediate control of the operator.

We claim as our invention:

1. A lathe comprising, in combination, a bed, a headstock, a spindle rotatably journaled in the headstock, an electric motor for driving the spindle, a solenoid brake for the spindle released when the motor is energized and applied when the motor is deenergized, a carriage reciprocable longitudinally of the bed at feed and traverse speeds, a planetary gearing having a driven sun gear connected to the carriage to impart thereto feed or traverse movement in a forward or return direction depending upon the speed and direction of rotation of said sun gear, a driving sun gear, planet gears meshing with said sun gears, and a planet gear carrier connected to be driven by said spindle motor, a reversible electric motor for rotating the driving sun gear at a high speed, a solenoid brake for holding said driving sun gear against rotation, applied when said reversible motor is deenergized and released when the motor is energized, a drum switch governing the control current for said spindle motor and brake and directly controlling the current for said reversible motor and brake having a rapid approach position when rocked to the extreme in one direction in which both motors are energized to drive the carriage at a traverse speed in a forward direction, a rapid return position when rocked to the extreme in the other direction in which the spindle motor is deenergized and the reversible motor is energized to rotate in reverse direction to drive the carriage at traverse speed in a return direction, and an intermediate neutral or feed position which if reached from rapid approach position deenergizes the reversible motor but maintains the spindle motor energized to drive the carriage at feed speed in a forward direction and if reached from rapid return position deenergizes the reversible motor and maintains the spindle motor deenergized to bring the carriage to rest, a disk driven by said driven sun gear to be rotated at a speed and in a direction corresponding to the speed and direction of movement of said carriage, manual means for rocking said switch from neutral to rapid approach position to energize both motors and thereby impart a rapid approach movement to said carriage, a first dog carried by said disk for rocking said switch from rapid approach to feed, a second dog for rocking said switch from feed to rapid return, and a third dog for rocking said switch from rapid return to neutral.

2. A lathe comprising, in combination, a bed, a headstock, a spindle rotatably journaled in the headstock, an electric motor for driving the spindle, a carriage reciprocable longitudinally of the bed at feed and traverse speeds, a differential gearing having a driven element connected to the carriage to impart thereto feed or traverse movement in a forward or return direction depending upon the speed and direction of rotation of said driven element, a first driving element connected to be driven by said spindle motor and a second driving element, a reversible electric motor for rotating the second driving element, a solenoid brake for holding said second driving element against rotation, said brake being applied when said reversible motor is deenergized and released when the motor is energized, a drum switch governing the control current for said spindle motor and directly controlling the current for said reversible motor and brake having a rapid approach position when rocked to the extreme in one direction in which both motors are energized to drive the carriage at traverse speed in a forward direction, a rapid return position when rocked to the extreme in the other direction in which the reversible motor is energized to rotate in reverse direction to drive the carriage at traverse speed in a return direction, and an intermediate neutral or feed position which if reached from rapid approach position deenergizes the reversible motor but maintains the spindle motor energized to drive the carriage at feed speed in a forward direction and if reached from rapid return position deenergizes both motors to bring the carriage to rest, a disk driven by said driven element to be rotated at a speed and in a direction corresponding to the speed and direction of movement of said carriage, manual means for rocking said switch from neutral to rapid approach position to energize both motors and thereby impart a rapid approach movement to said carriage, a first dog carried by said disk for rocking said switch from rapid approach to feed, a second dog for rocking said switch from feed to rapid return, and a third dog for rocking said switch from rapid return to neutral.

3. In a machine tool, a carriage reciprocable at feed and traverse speeds, a differential gearing having a driven element connected to the carriage to impart feed or traverse movement in a forward or return direction depending upon the speed and direction of rotation of said driven element, a first driving element and a second driving element, a first electric motor for driving said first driving element, a second reversible electric motor for driving said second driving element, a solenoid brake for holding said second driving element against rotation, said brake being applied when said reversible motor is deenergized and released when the motor is energized, a drum switch governing the control current for said first motor and directly controlling the current for said reversible motor and brake having a rapid approach position when rocked to the extreme in one direction in which both motors are energized to drive the carriage at traverse speed in a forward direction, a rapid return position when rocked to the extreme in the other direction in which the reversible motor is energized to rotate in reverse direction to drive the carriage at traverse speed in a return direction, and an intermediate neutral or feed position which if reached from rapid approach position deenergizes the reversible motor but maintains the first motor energized to drive the carrage at feed speed in a forward direction and if reached from rapid return position deenergizes both motors to bring the carriage to rest, a disk driven by said driven element to be rotated at a speed and in a direction corresponding to the speed and direction of movement of said carriage, manual means for rocking said switch from neutral to rapid approach position to energize both motors and thereby impart a rapid approach movement to said carriage, a first dog carried by said disk for rocking said switch from rapid approach to feed, a second dog for rocking said switch from feed to rapid return, and a third dog for rocking said switch from rapid return to neutral.

4. In a machine tool, a carriage reciprocable at feed and traverse speeds, a first electric motor, a second reversible electric motor, a gearing constantly in mesh connected between said carriage and said motors operable when said first motor is energized and said reversible motor is stationary to drive said carriage at a feed speed, and operable when said reversible motor is energized to drive said carriage at a traverse speed in a direction determined by the direction of rotation of said reversible motor, a drum switch governing the control current for said first motor and directly controlling the current for said reversible motor having a rapid approach position when rocked to the extreme in one direction in which both motors are energized to drive the carriage at traverse speed in a forward direction, a rapid return position when rocked to the extreme in the other direction in which the first motor is deenergized and the reversible motor is energized to rotate in reverse direction to drive the carriage at traverse speed in a return direction, and an intermediate neutral or feed position which if reached from rapid approach position deenergizes the reversible motor but maintains the first motor energized to drive the carriage at feed speed in a forward direction and if reached from rapid return position deenergizes the reversible motor and maintains the first motor deenergized to bring the carriage to rest, a disk driven by said gearing to be rotated at a speed and in a direction corresponding to the speed and direction of movement of said carriage, manual means for rocking said switch from neutral to rapid approach position to energize both motors and thereby impart a rapid approach movement to said carriage, a first dog carried by said disk for rocking said switch from rapid approach to feed, a second dog for rocking said switch from feed to rapid return, and a third dog for rocking said switch from rapid return to neutral.

5. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed, and operable when said reversible motor is energized to drive said member at a traverse speed in a direction determined by the direction of rotation of said reversible motor, and a drum switch governing the control current for said first motor and directly controlling the current for said reversible motor having a rapid approach position when rocked to the extreme in one direction in which both motors are energized to drive the member at traverse speed in a forward direction, a rapid return position when rocked to the extreme in the other direction in which the first motor is deenergized and the reversible motor is energized to rotate in reversed direction to drive the member at traverse speed in a return direction, and an intermediate neutral or feed position which if reached from rapid approach position deenergizes the reversible motor but maintains the first motor energized to drive the member at feed speed in a forward direction and if reached from rapid return position deenergizes the reversible motor and maintains the first motor deenergized to bring the member to rest.

6. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed and operable when said reversible motor is energized to drive said carriage at a traverse speed in a direction determined by the direction of rotation of said reversible motor, a drum switch controlling said motors, a disk rotated at a speed and in a direction corresponding to the speed and direction of movement of said member, manual means for rocking said switch to a position for energizing said reversible motor to run in a forward direction to impart a rapid approach movement to the member, a first dog carried by said disk for rocking said switch to a position in which said reversible motor is deenergized and said first motor is energized to impart a feed movement to the member, a second dog carried by said disk for rocking said switch to a position in which said reversible motor is energized to run in reverse direction to impart a rapid return movement to said member, and a third dog carried by said disk for rocking said switch to a position in which both motors are deenergized to bring said member to rest.

7. In a machine tool, a bed, a member reciprocable longitudinally of the bed, a planetary gearing having two coaxial sun gears one of which is connected to said member to drive the same at feed or traverse rates and in forward or return directions depending upon the speed and direction of rotation of the sun gear, a pair of planet gears keyed to a common shaft and each meshing with one of the sun gears and a carrier in which the shaft of said planet gears is journaled, a first electric motor having a connection with said carrier to rotate the same, a second reversible electric motor connected to the remaining one of said sun gears to rotate the same in opposite directions, electric switch means for controlling said motors, means driven, by the sun gear connected to said member, at a speed and in a direction corresponding to the speed and direction of movement of said member, manual means actuating said switch means to energize both motors to impart a rapid approach movement to the member, a first dog carried by said driven means actuating said switch means to deenergize said reversible motor whereby the first motor imparts a feed movement to said member, a second dog carried by said driven means actuating said switch means to deenergize the first motor and energize said reversible motor to run in reverse direction to impart a rapid return movement to said member, and a third dog carried by said driven means for actuating said switch means to deenergize the reversible motor and bring said member to rest.

8. In a machine tool, a bed, a member reciprocable longitudinally of the bed, a planetary gearing having two coaxial sun gears one of which is connected to said member to drive the same at feed or traverse rates and in forward or return directions depending upon the speed and direction of rotation of the sun gear, a pair of planet gears keyed to a common shaft and each meshing with one of the sun gears and a carrier in which the shaft of said planet gears is journaled, a first electric motor having a connection with said carrier to rotate the same, a second reversible electric motor connected to the remaining one of said sun gears to rotate the same in opposite directions, electric drum switch means for controlling said motors, means driven, by the sun gear connected to said member, at a speed and in a direction corresponding to the speed and direction of movement of said member, a manual switch operable to make or break the circuit to said drum switch to start and stop the machine, a first dog carried by said last named means for rocking said switch from rapid approach to feed position, a second dog for rocking said switch from feed to rapid return position, and a third dog for rocking said switch from rapid return through neutral to rapid approach position to repeat the cycle of operation of the machine.

9. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed and operable when said reversible motor is energized to drive said member at a traverse speed in a direction determined by the direction of rotation of said reversible motor, a drum switch controlling said motors, a disk rotated at a speed and in a direction corresponding to the speed and direction of movement of said member, manual switch means operable to make or break the circuit to said drum switch for starting and stopping the machine tool, a first dog carried by said disk for rocking said switch to a position in which said reversible motor is deenergized and said first motor is energized to impart a feed movement to the member, a second dog carried by said disk for rocking said switch to a position in which said reversible motor is energized to run in reverse direction to impart a rapid return movement to said member, and a third dog carried by said disk for rocking said switch to a position in which both motors are energized with said reversible motor rotating in forward direction to impart a rapid approach movement to the member.

10. In a lathe having a carriage, a spindle, an electric spindle motor, an electric rapid traverse motor and gearing connected between the motors and said carriage to drive the same at feed and traverse speeds, electrical control means for the motors comprising a switch for the spindle motor biased to open position, a solenoid for closing the switch, a drum switch directly controlling the current to said traverse motor and controlling an energizing circuit for said solenoid, and an energized circuit for said solenoid including a manual switch in parallel with said drum switch controlled energizing circuit to permit starting of said spindle motor independently of said drum switch.

11. In a lathe having a first electric motor and a second electric motor for driving movable elements of the lathe, electrical control means for the motors comprising a switch for the first motor biased to open position, a solenoid operable when energized to close the switch, a switch for directly controlling the current to the second motor, a first energizing circuit for said solenoid including a first stationary contact, a second stationary contact and a movable contact for controlling the circuit mechanically associated with said last named switch, a second energizing circuit including a push button switch in parallel with the switch formed by said stationary and movable contacts, and a holding circuit for said solenoid in parallel with both energizing circuits including said first stationary contact, said movable contact, a third stationary contact, and a switch closed upon closure of the switch for the first motor.

12. In a lathe having a carriage, a spindle, an electric motor for driving the spindle, a reversible electric rapid travense motor and gearing connected between the motors and said carriage to drive the same at feed and traverse speeds and in forward and return directions, electrical control means for the motors comprising a switch for the spindle motor biased to open position, a solenoid for closing the switch, a drum switch directly controlling the current to said traverse motor and partially controlling the energizing current for said solenoid, said drum switch having a rapid approach position and a rapid return position in which said traverse motor is energized to rotate in opposite directions and a neutral position in which said traverse motor is deenergized, a first energizing circuit for said solenoid controlled by said drum switch and completed when said switch is in rapid approach position, a second energizing circuit including a manual switch in parallel with said first circuit to permit energization of said spindle motor wholly independently of said drum switch, and a holding circuit for said solenoid in parallel with both energizing circuits including a switch associated with said spindle motor switch to close upon closure of the spindle motor switch, a manual switch and said drum switch, said drum switch closing the holding circuit when in rapid approach and neutral positions and breaking the same when in rapid return position.

13. A lathe comprising, in combination, a bed, a carriage reciprocable on said bed, a spindle, an electric motor for rotating said spindle, a reversible electric rapid traverse motor, gearing connected between the motors and said carriage and electrical control means governing said motors to drive said carriage at traverse and feed speeds and in forward and return directions comprising a switch for the spindle motor biased to open position, a solenoid operable when energized to close said switch, an energizing circuit for said solenoid, a holding circuit for said solenoid in parallel with said energizing circuit and including a holding switch associated with said spindle motor switch to be closed upon closure thereof, and a drum switch directly controlling the current to said traverse motor and controlling both the energizing circuit and the holding circuit for said solenoid.

14. A lathe comprising, in combination, a bed, a carriage reciprocable on said bed, a spindle, an electric motor for rotating said spindle, a reversible electric rapid traverse motor, gearing connected between the motor and said carriage and electrical control means governing said motors to drive said carriage at traverse and feed speeds and in forward and return directions comprising a switch for the spindle motor biased to open position, a solenoid operable when energized to close said switch, an energizing circuit for said solenoid, a holding circuit for said solenoid in parallel with said energizing circuit and including a holding switch associated with said spindle motor switch to be closed upon closure thereof, and a drum switch directly controlling the current to said traverse motor and controlling both the energizing circuit and the holding circuit for said solenoid comprising a stationary contact common to both circuits, a stationary contact in said energizing circuit, a stationary contact in said holding circuit, and a movable contact for electrically connecting the common stationary contact with either of the other stationary contacts.

15. A lathe comprising, in combination, a bed, a carriage reciprocable on said bed, a spindle, an electric motor for rotating said spindle, a reversible electric rapid traverse motor, gearing connected between the motor and said carriage and electrical control means governing said motors to drive said carriage at traverse and feed speeds and in forward and return directions comprising a switch for the spindle motor biased to open position, a solenoid operable when energized to close said switch, an energizing circuit for said solenoid, a holding circuit for said solenoid in parallel with said energizing circuit and including a holding switch associated with said spindle motor switch to be closed upon closure thereof, and a drum switch directly controlling the current to said traverse motor and controlling both the energizing circuit and the holding circuit for said solenoid comprising a reversing switch controlling said traverse motor, a first stationary contact common to both said energizing and said holding circuit, a second stationary contact in said energizing circuit, a third stationary contact in said holding circuit, and a movable contact for electrically connecting the common stationary contact with either said second or said third stationary contact, said drum switch having a rapid approach position in which said traverse motor is rotated forwardly and said common contact is connected to both said second and said third contacts, a feed position in which said traverse motor is deenergized and said common contact is connected only to said third contact, a rapid return position in which said traverse motor is rotated reversely and said common contact is disconnected from both said second and said third contacts, and a neutral position in which said traverse motor is deenergized and said common contact is connected only to said third contact.

16. A lathe comprising, in combination, a bed, a carriage reciprocable longitudinally of said bed, electrical drive means for reciprocating said carriage at feed and traverse speeds, a drum switch for controlling said drive means to obtain various movements of said carriage including rapid approach, feed and rapid return and having corresponding positions, a pin associated with said switch and mounted eccentrically of the axis thereof to rock the switch, a disk rotated in a direction and at a speed corresponding to the direction and speed of movement of said carriage, a first dog mounted on said disk operable upon striking said pin to rock said switch to feed position, a second dog operable upon striking said pin to rock said switch to rapid return position, and an arcuate bar connected between said dogs and overlying said pin to prevent rocking of said switch from feed directly to rapid approach position.

17. A lathe comprising, in combination, a bed, a carriage reciprocable longitudinally of the bed, drive means for reciprocating said carriage at feed and traverse rates, a switch for controlling said drive means to obtain a rapid approach, feed and rapid return movement of said carriage and having corresponding positions, means driven in timed relation to the movement of said carriage for shifting said switch, and means preventing shift of said switch from feed directly to rapid approach position.

18. A machine tool comprising, in combination, a bed, a carriage reciprocable longitudinally of the bed, drive means for reciprocating said carriage at feed and traverse rates, control means for said drive means actuable to obtain various movements of said carriage including a rapid approach and feed, and means associated with said control means preventing actuation thereof causing a change in carriage movement from feed directly to rapid approach.

19. A lathe comprising, in combination, a bed, a carriage reciprocable on said bed, drive means for reciprocating said carriage at feed and traverse rates, control means for said drive means actuable to obtain various movements of said carriage including rapid approach and feed, a first dog actuating said control means and defining commencement of feed movement, a second dog actuating said control means and defining termination of feed movement, said dogs and said control means being relatively movable in accordance with movement of said carriage, and means associated with said control means preventing actuation thereof to obtain rapid approach movement of said carriage while said carriage is within the limits of feed movement defined by said dogs.

20. A machine tool comprising, in combination, a bed, a carriage reciprocable on the bed, drive means for reciprocating said carriage at feed and traverse rates, means controlling said drive means to obtain movement of said carriage including rapid approach, feed and rapid return or to bring said carriage to rest and having corresponding positions, means driven in timed relation to the movement of said carriage for shifting said control means, and manual means associated with said control means operable at all times to shift said control means to rapid return position.

21. A lathe comprising a bed having a headstock at one end extending thereabove, a wall dividing the headstock from the bed, and ways along the upper front edge and along the upper rear edge, a spindle journalled in the headstock, a front carriage reciprocable longitudinally of the bed on the front ways, a rack on the lower edge of said carriage, a rear carriage adjustable longitudinally on the rear ways, a cross-slide on the rear carriage reciprocable transversely of the bed, drive means for the front carriage comprising a power source, gearing associated with said power source housed in a casing secured to the end of the bed and having a power shaft projecting into the bed, a power unit comprising a casing, a shaft journalled in the walls of said casing with its ends projecting therethrough, a pinion on one end meshing with the rack on said carriage, a worm wheel fast on said shaft and a worm meshing with the worm wheel, said power unit being inserted bodily through an aperture in the front wall of said bed and secured thereto, and shafting including two universal joints connecting said power shaft with said worm, a rib extending downwardly and inwardly from the upper front edge of the bed around said power unit and outwardly below the unit to the front wall of the bed and having a portion extending rearwardly to the rear wall completely enclosing the shafting and power unit to isolate the same from coolant and chips, said rib having an aperture in which said power unit is piloted, and drive means for said rear cross-slide comprising shafting extending transversely of the bed connected at one end to the shaft of said power unit and including two universal joints, and a conical rib extending from said first rib to the rear wall of said bed and encircling said shafting.

22. A lathe comprising a bed having a headstock at one end extending thereabove and a wall dividing the headstock from the bed, a spindle journaled in the headstock, a front carriage reciprocable longitudinally of the bed, a cross-slide on a rear carriage reciprocable transversely of the bed, drive means for the front carriage comprising a power source, gearing associated with said power source housed in a casing secured to the end of the bed and having a power shaft projecting into the bed, a power unit positioned within the bed at the front thereof having a driving connection with said front carriage and shafting connecting said power shaft with said power unit, a rib extending downwardly and inwardly from the upper front edge of the bed around said power unit and outwardly below the unit to the front wall of the bed and having a portion extending rearwardly to the rear wall of the bed completely to enclose the shafting and power unit to isolate the same from coolant and chips, said power unit having a hub and said rib having an aperture in which the hub is piloted, drive means for said rear cross-slide comprising shafting connected at one end to be driven by said power unit and extending transversely of the bed, and a conical rib extending from said first rib to the rear wall of said bed and encircling said shafting to protect the same from coolant and chips.

23. A lathe comprising a bed having a headstock at one end extending thereabove and a wall dividing the headstock from the bed, a spindle journaled in the headstock, a front carriage reciprocable longitudinally of the bed, a rear carriage, a cross-slide on the rear carriage reciprocable transversely of the bed, drive means for the front carriage comprising a power source, gearing associated with said power source housed in a casing secured to the end of the bed and having a power shaft projecting into the bed, a power unit positioned within the bed at the front thereof having a driving connection with said front carriage and shafting connecting said power shaft with said power unit, drive means for said rear cross-slide comprising shafting extending transversely of the bed connected at its forward end to said power unit to be driven thereby and terminating at its rear end within the rear carriage, and ribbing within the bed forming an enclosure for the power unit and shafting protecting the same against coolant and chips.

24. A lathe comprising a bed, a front carriage reciprocable longitudinally of the bed, a rear carriage adjustable longitudinally of the bed, a cross-slide on the rear carriage reciprocable transversely of the bed, means for driving the front carriage including a power unit having a short shaft extending transversely of the bed, and drive means for said cross-slide permitting adjustment of said rear carriage longitudinally of the bed without disconnection or change of the drive means comprising a first universal joint having one element connected to the shaft of said power unit, a shaft connected at one end to the other element of said universal joint and splined at the other end, a sleeve adapted to receive the splined end of said shaft, and a second universal joint having one element connected to said sleeve.

25. A lathe comprising a bed, a front carriage reciprocable longitudinally of the bed, a rear carriage adjustable longitudinally of the bed, a cross-slide on the rear carriage reciprocable transversely of the bed, means for driving the front carriage including a power unit having a short shaft extending transversely of the bed, and drive means for said cross-slide permitting adjustment of said rear carriage longitudinally of the bed without disconnection or change of the drive means comprising a first universal joint having one element connected to the shaft of said power unit, a shaft connected at one end to the other element of said universal joint and splined at the other end, a sleeve adapted to receive the splined end of said shaft, a second universal joint having one element connected to said sleeve, and means enclosing said first universal joint and splined shaft to protect the same from coolant and chips flaring from the front to the rear of the bed to permit longitudinal adjustment of said rear carriage.

26. In the machine tool, a bed, a carriage reciprocable on the bed, a first motor, a second motor, differential gearing having a driven element connected to said carriage to drive the same at feed and traverse rates and in forward and return directions depending upon the speed and direction of rotation of the driven element, a first driving element connected to be rotated by said first motor for imparting a feed movement to said carriage and a second driving element connected to be rotated in forward and reverse directions by said second motor to impart a traverse movement to said carriage, a brake for bringing said second driving element to rest and for holding the same against rotation, and detent means for aiding said brake in holding said second driving element against rotation.

27. In a machine tool, a bed, a carriage reciprocable on the bed, a first motor, a second motor, differential gearing having a driven element connected to said carriage to drive the same at feed and traverse rates and in forward and return directions depending upon the speed and direction of rotation of the driven element, a first driving element connected to be rotated by said first motor for imparting a feed movement to said carriage and a second driving element connected to be rotated in forward and reverse directions to impart a traverse movement to said carriage, a brake for bringing said second driving element to rest, mechanical detent means for holding said second driving element against rotation associated with said brake to be withdrawn upon release of the brake, and a governor controlled latch holding said detent means inoperative until said second driving element is brought to rest.

28. In a machine tool, a bed, a carriage reciprocable on the bed, a first electric motor, a second reversible electric motor, differential gearing having a driven element connected to said carriage to drive the same at feed and traverse speeds and in forward and return directions depending upon the speed and direction of rotation of the driven element, a first driving element connected to be rotated by said first motor to impart a feed movement to said carriage, a second driving element connected to be rotated in forward or reverse directions by said reversible motor to impart a tranverse movement to said carriage, a spring-applied brake for bringing said second driving element to rest, a solenoid operable when energized to release said brake, said solenoid being connected to be energized when said reversible motor is energized, mechanical detent means for holding said second driving element against rotation, said detent means being associated with said brake to be released upon release of the brake, and governor controlled latch means holding said detent means inoperative until said second driving element is brought to rest.

29. In a machine tool having a differential gearing for driving a carriage, a member directly connected to one of the driving elements of the differential gearing providing a brake drum, a motor connected to rotate said member, friction brake means for bringing said member to rest comprising brake shoes and a spring for applying the shoes, means for releasing said brake means when the motor is operated to rotate said member, mechanical detent means for aiding said brake mechanism comprising a ring secured to said member having notches formed in the periphery thereof and a pawl adapted to engage said notches to hold the member against rotation, said pawl being withdrawn by the means for releasing the brake when the brake is released, a latch device for holding said pawl out of engagement with said annular ring, and a governor responsive to the rotation of said member controlling the withdrawal of said latch to permit engagement of said pawl with said ring only upon cessation of rotation of said member.

30. In a machine tool having a differential gearing for driving a carriage, a member directly connected to a driving element of said gearing providing a brake drum, a reversible electric motor connected to rotate said member, brake mechanism for bring said member to rest and holding the same against rotation comprising brake shoes and a spring for applying said shoes, a solenoid connected in parallel with said motor operable when energized to release said brake mechanism, mechanical detent means for aiding said brake mechanism in holding said member against rotation comprising an annular ring secured to said member and having notches formed in the periphery thereof, a pivotally mounted pawl and a spring urging said pawl into engagement with said ring, means carried by said solenoid for withdrawing said pawl upon release of the brake mechanism, a pin projecting from said pawl, a latch associated with said pin operable in one position to prevent engagement of said bowl with said ring and in another position to permit such engagement, a spring for urging said latch to the latter position, and a centrifugal weight governor carried by said member and controlling said latch to retain the same in the position in which it holds said pawl out of engagement with said ring until said member is brought to rest.

31. In a machine, a differential gearing for driving a carriage and means for holding one of the elements of said gearing against rotation comprising friction brake means for bringing the element to rest and for holding the same against rotation, and detent means for aiding said friction brake in holding the element against rotation resisting rotation of the element by mechanical engagement.

32. In a machine tool, a carriage, a guideway on the carriage having an upright portion and lateral projections making the guideway generally T-shaped in transverse cross section, said guideway having a top horizontal bearing surface and downwardly and outwardly inclined bearing surfaces on the lateral projections, a slide movable on the guideway having a horizontal surface and downwardly and outwardly inclined surfaces complemental respectively to the horizontal and inclined surfaces on said guideway, and inward extensions adapted to project beneath the lateral projections on said guideway, and a single adjustable tapered gib interposed between complemental inclined surfaces to maintain all bearing surfaces in contact.

33. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed, and operable when said reversible motor is energized to drive said member at a traverse speed in a direction detemined by the direction of rotation of said reversible motor, and a drum switch governing said motors and rockable to various positions to obtain a cycle of movement of said member including rapid approach, feed and rapid return.

34. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed, and operable when said reversible motor is energized to drive said member at a traverse speed in a direction determined by the direction of rotation of said reversible motor, and a drum switch comprising means governing control current for said first motor and a reversing switch directly controlling the main current for said reversible motor.

35. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed, and operable when said reversible motor is energized to drive said member at a traverse speed in a direction determined by the direction of rotation of said reversible motor, and a unitary switch means controlling said motors having a rapid approach position when rocked to the extreme in one direction in which both motors are energized to drive the member at a traverse speed in a forward direction, a rapid return position when rocked to the extreme in the other direction in which the reversible motor is energized to rotate in reverse direction to drive the member at traverse speed in a return direction, and an intermediate neutral or feed position which if reached from rapid approach position deenergizes the reversible motor but maintains the first motor energized to drive the member at feed speed in a forward direction, and if reached from rapid return position deenergizes the reversible motor to bring the member to rest.

36. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed, and operable when said reversible motor is energized to drive said member at a traverse speed in a direction determined by the direction of rotation of said reversible motor, switch means governing said motors actuable to obtain a cycle of movement of said member including rapid approach, feed, and rapid return movements, and manual means for actuating said switch means to obtain any of said movements.

37. In a machine tool, a bed, a member reciprocable longitudinally of the bed, a planetary gearing having two coaxial sun gears one of which is connected to said member to drive the same at feed or traverse rates and in forward or return directions depending upon the speed and direction of rotation of the sun gear, a pair of planet gears keyed to a common shaft and each meshing with one of the sun gears and a carrier in which the shaft of said planet gears is journaled, a first electric motor having a connection with said carrier to rotate the same, a second reversible electric motor connected to the remaining one of said sun gears to rotate the same in opposite directions, electric switch means for controlling said motors, actuable to obtain a cycle of movement of said member including rapid approach, feed and rapid return, and manual means for initiating a rapid approach movement.

38. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed and operable when said reversible motor is energized to drive said member at a traverse speed in a direction determined by the direction of rotation of said reversible motor, switch means for controlling said motors, manual switch means for starting and stopping the machine, a first dog movable in accordance with the movement of said member for actuating said first named switch means to obtain a feed movement of said member, a second dog movable in accordance with said member for actuating said first named switch means to obtain a rapid return movement, and a third dog movable in accordance with said member for actuating said first named switch means to obtain a rapid approach movement of said member.

39. In a machine tool having a first electric motor and a second electric motor for driving movable elements of a machine, electrical control means for the motors comprising a switch for the first motor biased to open position, a solenoid operable when energized to close the switch, switch means for directly controlling the current to the second motor, a first energizing circuit for said solenoid including said switch means, a second energizing circuit for said solenoid including a push button switch in parallel with said switch means, and a holding circuit for said solenoid in parallel with both energizing circuits including a switch closed upon closure of the switch for said first motor.

40. A lathe comprising a bed having a headstock at one end extending thereabove and closing the top of that end of the bed, a spindle journaled in the headstock, a front carriage reciprocable longitudinally of the bed, drive means for the front carriage comprising a power source, gearing associated with said power source and having a power shaft projecting into the bed, a power unit positioned within the bed at the front thereof having a driving connection with said front carriage and shafting connecting said power shaft with said power unit, and ribbing within the bed completing enclosure of the power unit and shafting to protect the same against coolant and chips.

41. A lathe comprising a bed having a headstock at one end thereof, a spindle journaled in the headstock, a front carriage reciprocable longitudinally of the bed, drive means for the front carriage comprising a power source, gearing associated with said power source housed in a casing and removably secured as a unit to the end of the bed, said gearing having a power shaft projecting into the bed, a power unit removably positioned as a unit within the bed at the front thereof and having a driving connection with said front carriage, and shafting connecting said power shaft with said power unit, said shafting including two universal joints.

42. A lathe comprising a bed having a partially open top, a front carriage reciprocable longitudinally of the bed, a rear carriage adjustable longitudinally of the bed, a cross-slide on the rear carriage reciprocable transversely of the bed, means for driving the front carriage including a power unit having a short shaft extending transversely of the bed, and drive means for said cross slide including shafting extending transversely of the bed and connected at one end to the shaft of said power unit, and means extending from the front to the rear wall of the bed encircling said shafting to protect the same against coolant and chips.

43. In a machine, a reciprocable member, driving means for said member including a differential gearing, and means for holding one of the elements of said gearing against rotation comprising friction brake means for bringing the element to rest and for holding the same against rotation, and detent means for aiding said friction brake by mechanical engagement in holding the element against rotation.

44. In a machine tool, a member reciprocable at feed and traverse speeds, a first electric motor, a second reversible electric motor, a gearing constantly in mesh connected between said member and said motors operable when said first motor is energized and said reversible motor is stationary to drive said member at a feed speed, and operable when said reversible motor is energized to drive said member at a traverse speed in a direction determiend by the direction of rotation of said reversible motor, and electric switch means governing said motors rockable to various positions to obtain a cycle of movement of said member including rapid approach, feed and rapid return and a single handle for rocking said switch means.

45. In a machine tool, a member reciprocable at feed and traverse speeds, a first motor, a second reversible motor, a gearing constantly in mesh connected between said member and said motors operable when said first motor is running and said reversible motor is stationary to drive said member at a feed speed, and operable when said reversible motor is running to drive said member at a traverse speed in a direction determined by the direction of rotation of said reversible motor, and a unitary control means for governing said motors rockable to various positions by a single means to obtain a cycle of movement of said member including rapid approach, feed and rapid return.

46. In a machine tool, a member reciprocable at feed and traverse speeds, a first motor, a second reversible motor, a gearing constantly in mesh connected between said member and said motors operable when said first motor is running and said reversible motor is stationary to drive said member at a feed speed, and operable when said reversible motor is running to drive said member at a traverse speed in a direction determined by the direction of rotation of said reversible motor, and a unitary control means for governing said motors shiftable to a first extreme position for effecting a rapid traverse movement in one direction, to a second extreme position to effect a rapid traverse movement in the opposite direction, and to an intermediate or neutral position to render the reversible motor inoperative whereby a feed rate of movement of the member is obtained.

47. In a machine tool, a member reciprocable at feed and traverse speeds, a first motor, a second reversible motor, a gearing constantly in mesh connected between said member and said motors operable when said first motor is running and said reversible motor is stationary to drive said member at a feed speed and operable when said reversible motor is running to drive said member at a traverse speed in a direction determined by the direction of rotation of said reversible motor, governing means for controlling said motors, manual means for actuating said governing means to cause said motors to impart a rapid approach movement to the member, a first dog mounted to move at a speed and in a direction corresponding to the speed and direction of movement of said member and disposed to actuate said governing means to a position in which said reversible motor is inoperative and said first motor is operable to impart a feed movement to the member, a second dog mounted to move at a speed and in a direction corresponding to the speed and direction of movement of said member and disposed to actuate said governing means to a position in which said reversible motor is rendered operative to run in reverse direction to impart a rapid return movement to said member, and a third dog mounted to move at a speed and in a direction corresponding to the speed and direction of movement of said member and disposed to actuate said governing means to a position in which the member is brought to rest.

48. In a machine tool, a carriage, a first electric motor, an electric rapid traverse motor, and gearing connected between the motors and said carriage to drive the same at feed and traverse speeds, electrical control means for the motors comprising a switch for the first motor biased to open position, a solenoid for closing the switch, a second switch means directly controlling the current to said traverse motor and controlling an energizing circuit for said solenoid, and an energizing circuit for said solenoid including a manual switch in parallel with said second switch means controlled energizing circuit to permit starting of said first motor independently of said second switch means.

49. In a machine tool, a main frame, a first support rotatably mounted in said frame, a second support reciprocably mounted upon said frame, one of said supports constituting a tool support and the other of said supports constituting a work support, a first motor for driving said first support, a driving train connected between said first and said second supports including a change-speed gearing and a planetary gear device, and a frame upon which said change speed gearing and said planetary gear device are supported, said frame and said gearing and planetary gear device being removably attached externally of the main frame as a unit.

50. In a machine tool, a main frame, a carriage reciprocable upon the frame, power means for driving said carriage including a power unit comprising a casing, a worm journaled in said casing, a shaft extending transversely of said worm and journaled at its ends in said casing and at each end projecting through the wall of the casing, and a worm wheel fixed on said shaft, and said main frame having an opening through which the power unit is inserted or removed as a unit.

51. In a machine tool having a bed, a carriage reciprocable on the bed, and a driving means for the carriage including a plurality of motors, control means for the motors comprising a first shaft supporting control devices and rockable to various positions to obtain various movements of the carriage, manual means for rocking said shaft, and a second shaft carrying means driven at the speed and in the direction of movement of said carriage also operable to rock said first shaft.

52. In a machine tool having a bed, a carriage reciprocable on the bed, and a driving means for the carriage including a plurality of motors, control means for the motors comprising a first shaft supporting control devices and rockable to various positions to obtain various movements of the carriage, manual means for rocking said shaft, a second shaft rotated at a speed and in a direction corresponding to the speed and direction of movement of the carriage, a disk fixed on said second shaft, a plurality of dogs carried by said disk, and means on said first shaft disposed in the path of the dogs and operable to be actuated by said dogs to rock the first shaft to various positions.

53. In a machine tool having a bed, a carriage reciprocable on the bed, and power means for reciprocating the carriage including a plurality of electric motors, an electric drum switch for controlling the motors comprising a rockably mounted shaft, a first and a second contact bracket fixed on the shaft each having a double segmental contact shoe and two single contact shoes, a third bracket fixed on said shaft having two segmental contact shoes, and a pair of fixed contacts disposed in the plane of each bracket on opposite sides of said shaft to cooperate with the various shoes in the different positions of the shaft.

54. In a machine tool, a bed, a carriage reciprocable on the bed, a first motor, a second motor, differential gearing having a driven element connected to said carriage to drive the same at feed and traverse rates and in forward and return directions depending upon the speed and direction of rotation of the driven element, a first driving element connected to be rotated by said first motor for imparting a feed movement to said carriage and a second driving element connected to be rotated in forward and reverse directions by said second motor to impart a traverse movement to said carriage, a brake for bringing said second driving element to rest, and detent means for holding said second driving element against rotation.

55. In a machine, a differential gearing for driving a carriage and means for holding one of the elements of said gearing against rotation comprising friction brake means for bringing the element to rest, and detent means for holding the element against rotation resisting rotation of the element by mechanical engagement.

BENGT GRANBERG.
JOHN B. SINDERSON.